United States Patent
Sakuma et al.

(10) Patent No.: US 10,371,029 B2
(45) Date of Patent: Aug. 6, 2019

(54) EXHAUST GAS CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Tetsuya Sakuma, Gotemba (JP); Yoshihisa Tsukamoto, Susono (JP)

(73) Assignee: Toyota Jidasha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/827,242

(22) Filed: Nov. 30, 2017

(65) Prior Publication Data
US 2018/0163591 A1  Jun. 14, 2018

(30) Foreign Application Priority Data

Dec. 9, 2016 (JP) .................. 2016-239231

(51) Int. Cl.
*F01N 3/08* (2006.01)
*F01N 3/20* (2006.01)
(Continued)

(52) U.S. Cl.
CPC ......... *F01N 3/2013* (2013.01); *F01N 3/0814* (2013.01); *F01N 3/2066* (2013.01); *F01N 9/00* (2013.01); *F01N 11/00* (2013.01); *F01N 11/002* (2013.01); *F01N 13/009* (2014.06); *F01N 2240/16* (2013.01); *F01N 2260/04* (2013.01); *F01N 2550/02* (2013.01); *F01N 2550/03* (2013.01); *F01N 2560/06* (2013.01);
(Continued)

(58) Field of Classification Search
CPC combination set(s) only.
See application file for complete search history.

(56) References Cited

U.S. PATENT DOCUMENTS 8,875,505 B2 *  11/2014  Douglas ............... F01N 9/00
                                              180/309
9,890,676 B2 *  2/2018  Kawabata ............ B01J 37/0244
(Continued)

FOREIGN PATENT DOCUMENTS

CN     101298845 A     11/2008
CN     104279029 A     1/2015
(Continued)

*Primary Examiner* — Binh Q Tran
(74) *Attorney, Agent, or Firm* — Finnegan, Henderson, Farabow, Garrett & Dunner, LLP

(57) ABSTRACT

An exhaust gas control apparatus for an internal combustion engine includes: an SCR catalyst including transition metal ions for reducing $NO_X$ in exhaust gas with $NH_3$ as a reducing agent; detection means for detecting temperature of the SCR catalyst; and a heater configured to heat the SCR catalyst. When $NO_X$ does not flow into the SCR catalyst, and the temperature detected by the detection means is below a first temperature that is a temperature causing exhibition of valence recovery of transition metal ions, the heater is controlled such that the SCR catalyst is heated up to a first temperature or above and that the SCR catalyst is maintained at or above the first temperature for a prescribed period so as to achieve valence recovery of the transition metal ions put in a deteriorated state.

14 Claims, 9 Drawing Sheets

(51) Int. Cl.
*F01N 9/00* (2006.01)
*F01N 11/00* (2006.01)
*F01N 13/00* (2010.01)

(52) U.S. Cl.
CPC ...... *F01N 2570/14* (2013.01); *F01N 2610/02* (2013.01); *F01N 2900/1602* (2013.01); *F01N 2900/1621* (2013.01); *Y02T 10/24* (2013.01); *Y02T 10/47* (2013.01)

(56) References Cited

U.S. PATENT DOCUMENTS

| | | | |
|---|---|---|---|
| 9,968,886 B2 * | 5/2018 | Balenovic | F01N 9/00 |
| 2008/0271440 A1 | 11/2008 | Xu et al. | |
| 2009/0056310 A1 | 3/2009 | Xu et al. | |
| 2011/0000194 A1 * | 1/2011 | Gonze | F01N 3/027 60/286 |
| 2012/0270725 A1 | 10/2012 | Chen et al. | |
| 2015/0013309 A1 | 1/2015 | Upadhyay et al. | |
| 2015/0184567 A1 * | 7/2015 | Yamashita | F01N 9/00 60/286 |

FOREIGN PATENT DOCUMENTS

| | | |
|---|---|---|
| EP | 3 091 205 A1 | 11/2016 |
| EP | 3 091 206 A1 | 11/2016 |
| JP | 06-185350 A | 7/1994 |
| JP | 11-210448 A | 8/1999 |
| JP | 2002-47922 | 2/2002 |
| JP | 4412595 B2 | 2/2010 |
| JP | 2014-159789 A | 9/2014 |
| JP | 2016-153602 A | 8/2016 |
| JP | 2016-173037 A | 9/2016 |
| WO | WO2016/194735 | 12/2016 |

* cited by examiner

EXHAUST GAS CONTROL APPARATUS FOR INTERNAL COMBUSTION ENGINE

INCORPORATION BY REFERENCE

The disclosure of Japanese Patent Application No. 2016-239231 filed on Dec. 9, 2016 including the specification, drawings and abstract is incorporated herein by reference in its entirety.

BACKGROUND

1. Technical Field

The present disclosure relates to an exhaust gas control apparatus for an internal combustion engine, and more particularly relates to an exhaust gas control apparatus including a selective catalytic reduction catalyst (SCR catalyst).

2. Description of Related Art

There is known an exhaust gas control apparatus for an internal combustion engine operated to perform lean combustion driving (see, for example, Japanese Patent Application Publication No. 2002-047922). The exhaust gas control apparatus includes an SCR catalyst disposed in an exhaust passage, an addition device that adds an additive that is $NH_3$ or a precursor of $NH_3$ to exhaust gas flowing into the SCR catalyst, and a heater that heats the SCR catalyst. The exhaust gas control apparatus is configured to heat the SCR catalyst up to an active temperature with the heater immediately before the internal combustion engine is started.

SUMMARY

A $NO_X$ reduction action in the SCR catalyst is exhibited by an action of transition metal ions which are supported by catalyst carriers of the SCR catalyst. Specifically, the transition metal ions adsorb $NH_3$ supplied from the addition device. When an ionic valence of the transition metal ions containing adsorbed $NH_3$ is equal to the valence necessary for $NO_X$ reduction (such a state is referred to as "reference state" below), the transition metal ions cause a reaction between $NH_3$ and $NO_X$ in the exhaust gas, so that $NO_X$ in the exhaust gas is reduced to $N_2$. In that case, since the ionic valence of the transition metal ions becomes less than the valence necessary for $NO_X$ reduction, $NO_X$ reduction capacity of the transition metal ions deteriorates (such a state is referred to as "deteriorated state" below). However, $H^+$ is adsorbed to the transition metal ions in the deteriorated state at the time of the reaction between $NH_3$ and $NO_X$. When $H^+$ adsorbed to the transition metal ions in the deteriorated state reacts with $O_2$ or $NO_2$ in the exhaust gas, the transition metal ions are re-oxidized, and thereby the ionic valence of the transition metal ion is recovered to the ionic valence necessary for $NO_X$ reduction. Accordingly, in order to achieve continuous $NO_X$ reduction with the SCR catalyst, it is necessary to recover the ionic valence of the transition metal ions, which is put in the deteriorated state, to the valence necessary for $NO_X$ reduction.

Recovery of the ionic valence (referred to as "valence recovery" below) of the transition metal ions put in the deteriorated state is exhibited in the atmosphere whose temperature is above the temperature (active temperature) at which $NO_X$ reduction by the transition metal ions in the reference state starts to be exhibited, the atmosphere containing $O_2$ and $NO_2$. Accordingly, when low-load operation of the internal combustion engine continues, or when the exhaust gas flowing into the SCR catalyst continues to have an air-fuel ratio at or below a stoichiometric air-fuel ratio, the transition metal ions in the reference state may continuously decrease, while the transition metal ions in the deteriorated state may continuously increase. As a result, $NO_X$ reduction performance of the SCR catalyst may be deteriorated, and continuous $NO_X$ reduction by the SCR catalyst may become difficult. When the internal combustion engine is shut down in the state where the amount of the transition metal ions in the deteriorated state is relatively large, valence recovery of most of the transition metal ions in the deteriorated state may be failed even when the SCR catalyst is temporarily heated before next start of operation as in the aforementioned related art. This is because as the amount of the transition metal ions in the deteriorated state increases, the time needed for valence recovery of these transition metal ions becomes longer.

The present disclosure provides a technique for an exhaust gas control apparatus including an SCR catalyst, in which the ionic valence of transition metal ions contained in the SCR catalyst can suitably be recovered.

The present disclosure controls the heater such that the SCR catalyst is heated to a first temperature or above and is maintained at that state for a prescribed period, when $NO_X$ does not flow into the SCR catalyst, and the temperature of the SCR catalyst is below the first temperature.

Specifically, the exhaust gas control apparatus for an internal combustion engine of the present disclosure includes: an SCR catalyst disposed in an exhaust passage of the internal combustion engine, the SCR catalyst including transition metal ions for reducing $NO_X$ in exhaust gas with $NH_3$ as a reducing agent; detection means for detecting temperature of the SCR catalyst; a heater configured to heat the SCR catalyst, and control means for executing recovery processing when $NO_X$ does not flow into the SCR catalyst, and the temperature detected by the detection means is below a first temperature that is a temperature causing exhibition of valence recovery of the transition metal ions, the recovery processing being processing of controlling the heater such that the SCR catalyst is heated up to the first temperature or above and that the SCR catalyst is maintained at or above the first temperature for a prescribed period.

A term "valence recovery" used herein refers to recovery of ionic valence of the transition metal ions to the valence necessary for $NO_X$ reduction through reoxidation of the transition metal ions put in the deteriorated state as described before. A term "first temperature" is the temperature causing exhibition of valence recovery of the transition metal ions in the deteriorated state. The first temperature is above the temperature (active temperature) at which $NO_X$ reduction by the transition metal ions in the reference state starts to be exhibited. Furthermore, a term "prescribed period" refers to the period necessary for valence recovery of substantially the entire amount of the transition metal ions in the deteriorated state.

When the temperature of the SCR catalyst is raised to the first temperature or above while $NO_X$ does not flow into the SCR catalyst, the $NO_X$ reduction by the transition metal ions in the reference state is not exhibited, but the valence recovery by the transition metal ions in the deteriorated state is exhibited. Accordingly, the amount of the transition metal ions in the deteriorated state can efficiently be reduced. When the SCR catalyst is maintained at or above the first temperature for the prescribed period, the ionic valence of substantially the entire amount of the transition metal ions in the deteriorated state can be recovered. Therefore, when $NO_X$ flows into the SCR catalyst after the recovery processing is ended, it is possible to suppress such situations where $NO_X$ reduction performance of the SCR catalyst is deteriorated and where continuous $NO_X$ reduction by the SCR catalyst is difficult.

Here, the case where $NO_X$ does not flow into the SCR catalyst may be the case where the internal combustion engine is shut down. However, the temperature of the SCR catalyst becomes lower as the lapsed time from the shutdown of the internal combustion engine becomes longer. Accordingly, when it is attempted to heat the SCR catalyst up to the first temperature or above after a relatively long time has lapsed from the shutdown of the internal combustion engine, energy consumed by the heater may possibly increase. To avoid such a situation, the recovery processing may be executed immediately after the shutdown of the internal combustion engine. That is, the control means in the present disclosure may execute the recovery processing with the shutdown of the internal combustion engine as a trigger. In that case, since the recovery processing is executed while the SCR catalyst is at a relatively high temperature, the energy necessary for the heater to heat the SCR catalyst up to the first temperature or above can be kept low.

Depending on the operating state of the internal combustion engine before the shutdown, the SCR catalyst may be at or above the first temperature upon the shutdown. In that case, it is estimated that valence recovery of the transition metal ions in the deteriorated state is automatically attained before shutdown and immediately after shutdown of the internal combustion engine. Therefore, when the temperature of the SCR catalyst upon shutdown of the internal combustion engine is equal to or above the first temperature, execution of recovery processing may be prohibited. However, in the case as described above, the ionic valence of substantially the entire amount of the transition metal ions in the deteriorated state is not necessarily recovered in an automatic manner. Accordingly, in view of more reliably reducing the amount of the transition metal ions in the deteriorated state (more reliably increasing the amount of the transition metal ions in the reference state), the recovery processing may be executed when the temperature of the SCR catalyst upon shutdown of the internal combustion engine is the first temperature or above as when the temperature of the SCR catalyst is below the first temperature. However, in the period after the internal combustion engine is shut down until the temperature of the SCR catalyst decreases to below the first temperature, valence recovery of the transition metal ions in the deteriorated state is automatically performed without heating of the SCR catalyst with the heater (such a period is referred to as "automatic recovery period" below). Accordingly, the recovery processing may be executed when the temperature of the SCR catalyst decreases to below the first temperature after the internal combustion engine is shutdown (when an automatic stop period expires). When the recovery processing is executed by such a method, the period (prescribed period) for maintaining the SCR catalyst at or above the first temperature with use of the heater may be defined as a period necessary for valence recovery of the amount of transition metal ions in the deteriorated state at the end of the automatic recovery period. Such setting of the prescribed period makes it possible to minimize the consumption energy of the heater, while minimizing the amount of the transition metal ions in the deteriorated state.

In the configuration where the recovery processing is executed during the shutdown of the internal combustion engine as described in the foregoing, the control means may control the heater such that the temperature of the SCR catalyst during execution of the recovery processing becomes equal to or above the first temperature and below a second temperature that is the temperature causing exhibition of $NH_3$ oxidation. Here, when the internal combustion engine is shut down, there is a possibility that $NH_3$ is adsorbed to at least some of the transition metal ions included in the SCR catalyst. In such a case, when the temperature of the SCR catalyst during execution of the recovery processing is raised to the second temperature or above, $NH_3$ adsorbed to the transition metal ions is oxidized. To cope with this situation, the heater is controlled such that the temperature of the SCR catalyst during execution of the recovery processing becomes equal to or above the first temperature and below the second temperature. This makes it possible to achieve valence recovery of the transition metal ions in the deteriorated state without oxidizing $NH_3$ adsorbed to the transition metal ions. As a result, when $NO_X$ flows into the SCR catalyst after the next start of the internal combustion engine, it becomes possible to reduce $NO_X$ inflow with use of $NH_3$ adsorbed to the transition metal ions.

Here, $NH_3$ adsorbed to the transition metal ions of the SCR catalyst tends to desorb in the atmosphere at or above a specified temperature (referred to as "third temperature" below) that is above the first temperature and below the second temperature. Accordingly, if the temperature of the SCR catalyst at the time when the internal combustion engine is shut down is above the third temperature, it can be assumed that the amount of $NH_3$ adsorbed to the transition metal ions is substantially zero at that time. Accordingly, in the configuration where the recovery processing is executed during the shutdown of the internal combustion engine, if the temperature, detected by the detection means when the internal combustion engine is shut down, is the third temperature or above, the control means may control the heater such that the temperature of the SCR catalyst during execution of the recovery processing becomes the second temperature or above. The amount of the transition metal ions whose ionic valence is recovered per unit time tends to be larger as the temperature of the SCR catalyst becomes higher. Accordingly, in the case where the temperature of the SCR catalyst during the recovery processing is raised up to the second temperature or above, the execution period of the recovery processing can be shortened as compared with the case where the temperature is kept less than the second temperature. As a result, even when the period from the shutdown to the restart of the internal combustion engine is short, it becomes easy to complete the recovery processing.

Other cases where $NO_X$ does not flow into the SCR catalyst may include the case where a gas that does not contain $NO_X$ flows through the SCR catalyst. A term "gas that does not include $NO_X$" refers to not only the gas that does not contain $NO_X$ at all but also the gas including a minute amount of $NO_X$ (the amount considered to achieve efficient valence recovery of the transition metal ions which are put in the deteriorated state in the SCR catalyst, the amount being referred to as "acceptable $NO_X$ amount"). Examples of the case where such a gas flows through the SCR catalyst includes the case where $NO_X$ in exhaust gas is removed upstream of the SCR catalyst during operation of the internal combustion engine, and the case where fuel-cut processing of the internal combustion engine is executed. Examples of the case where $NO_X$ is removed upstream of the SCR catalyst during operation of the internal combustion engine may include, for example, the case where a NSR catalyst is configured to be disposed in a portion of the exhaust passage upstream of the SCR catalyst, and an air-fuel ratio of the exhaust gas flowing into the NSR catalyst is a lean air-fuel ratio that is higher than a stoichiometric air-fuel ratio. The NSR catalyst used herein is a $NO_X$ storage reduction catalyst that stores $NO_X$ in exhaust gas when the air-fuel ratio of the exhaust gas is a lean air-fuel ratio. The NSR catalyst also reduces, while emitting, the stored $NO_X$, when the air-fuel ratio of the exhaust gas is a rich air-fuel ratio which is lower than the stoichiometric air-fuel ratio. However, when the $NO_X$ storage amount of the NSR catalyst becomes relatively large, part of $NO_X$ flowing into the NSR catalyst tends to slip through the NSR catalyst even when the air-fuel ratio of the exhaust gas flowing into the NSR catalyst is the lean air-fuel ratio. Accordingly, when the air-fuel ratio of the exhaust gas flowing into the NSR catalyst is a lean air-fuel ratio and the $NO_X$ storage amount of the NSR catalyst is a specified upper limit or below, it may be determined that $NO_X$ is removed upstream of the SCR catalyst. A term "specified upper limit" used herein is a value set on the assumption that if the $NO_X$ storage amount of the NSR catalyst exceeds the specified upper limit, the amount of $NO_X$ beyond the aforementioned acceptable $NO_X$ amount can slip through the NSR catalyst.

As described before, $NH_3$ adsorbed to the transition metal ions of the SCR catalyst tends to desorb in the atmosphere at or above the third temperature. When the recovery processing is executed during shutdown of the internal combustion engine, there is no gas flow in the SCR catalyst. Accordingly, even when $NH_3$ desorbs from the transition metal ions during the recovery processing, the desorbed $NH_3$ stays within the SCR catalyst. There is a high possibility that the $NH_3$ staying within the SCR catalyst is re-adsorbed to the transition metal ions, when the temperature of the SCR catalyst after the end of the recovery processing decreases below the third temperature. Therefore, as described before, when the recovery processing is executed during shutdown of the internal combustion engine, it can be said that there is no necessity of restricting the temperature of the SCR catalyst to below the third temperature. When the recovery processing is executed while the gas that does not contain $NO_X$ flows through the SCR catalyst, $NH_3$ desorbed from the transition metal ions tends to be discharged from the SCR catalyst together with the gas. Accordingly, when there is a gas flow in the SCR catalyst, and $NH_3$ is desorbed from the transition metal ions in that state, the desorbed $NH_3$ is less likely to be re-adsorbed to the transition metal ions. Accordingly, in the configuration where the recovery processing is executed while the gas that does not contain $NO_X$ flows through the SCR catalyst, the temperature of the SCR catalyst may be restricted to below the third temperature. That is, when the recovery processing is executed while the gas that does not contain $NO_X$ flows through the SCR catalyst, the control means may control the heater such that the temperature of the SCR catalyst becomes equal to or above the first temperature and below the third temperature. According to such a configuration, when the gas including $NO_X$ flows into the SCR catalyst after the recovery processing is ended, the $NO_X$ inflow can be reduced using the $NH_3$ adsorbed to the transition metal ions.

In the configuration where the recovery processing is executed while the gas that does not contain $NO_X$ flows through the SCR catalyst, it can be assumed that the amount of the $NH_3$ adsorbed to the transition metal ions is substantially zero when the temperature of the SCR catalyst upon start of the recovery processing is the third temperature or above. Accordingly, if the temperature, detected by the detection means upon start of the recovery processing, is the third temperature or above, the control means may control the heater such that the temperature of the SCR catalyst during execution of the recovery processing becomes the second temperature or above. According to such a configuration, it becomes easy to complete the recovery processing even when the gas that does not contain $NO_X$ flows through the SCR catalyst for a short time.

When the recovery processing is executed while the gas that does not contain $NO_X$ flows through the SCR catalyst, the control means may control the heater such that the heating amount of the SCR catalyst decreases in the case where the amount of the gas flowing through the SCR catalyst is small, as compared with the case where the amount of gas is large. In the case where the amount of the gas flowing through the SCR catalyst is small, the amount of heat transmitted from the SCR catalyst to the gas decreases as compared with the case where the amount of gas is large. Accordingly, when the amount of the gas flowing through the SCR catalyst is small, the SCR catalyst may be maintained at or above the first temperature with a smaller heating amount as compared in the case where the amount of the gas is large. As a result, the consumption energy of the heater can be controlled to be lower.

Next, the exhaust gas control apparatus for an internal combustion engine according to the present disclosure may further include estimation means for estimating a requested recovery amount that is the amount of transition metal ions that need valence recovery (the amount of the transition metal ions in the deteriorated state), among the transition metal ions supported by the SCR catalyst. In that case, the estimation means may execute the recovery processing such that in the case where the requested recovery amount is small, a prescribed period is shortened as compared with the case where the requested recovery amount is large. According to such a configuration, the period of heating the SCR catalyst with the heater can be controlled to be as short as possible. As a result, the consumption energy of the heater can be controlled to be as low as possible.

The control means may not execute the recovery processing, when the requested recovery amount estimated by the estimation means is below a specified threshold. The term "specified threshold" used herein is a value considered to be small enough to allow the SCR catalyst to demonstrate desired $NO_X$ reduction performance if the requested recovery amount is below the specified threshold, or is a value considered to be small enough to allow continuous $NO_X$ reduction by the SCR catalyst. According to such a configuration, it becomes possible to suppress increase in the consumption energy relating to the operation of the heater, while securing the reduction function of the SCR catalyst.

According to the present disclosure, an exhaust gas control apparatus including an SCR catalyst can suitably recover the ionic valence of transition metal ions included in the SCR catalyst.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Specific embodiments of the present disclosure will be described below with reference to the accompanying drawings. Note that sizes, materials, shapes, and relative arrangements of component members disclosed in the embodiments are not intended to restrict the technical scope of the present disclosure thereto unless otherwise specified.

First Embodiment

Figure 1:
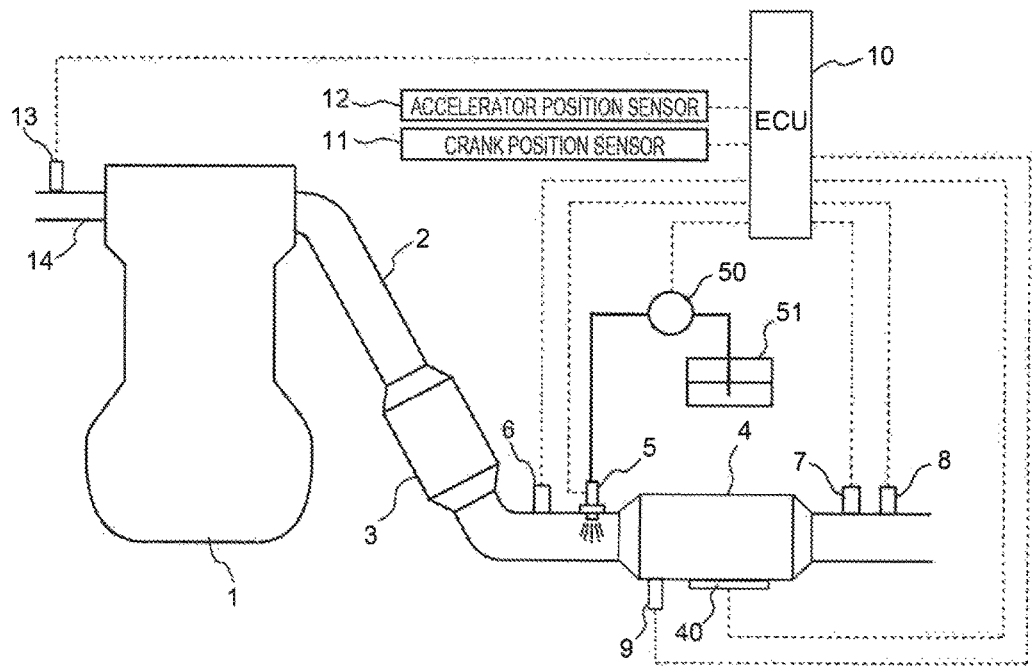
FIG. 1 illustrates a schematic configuration of an internal combustion engine to which the present embodiment is applied, and an intake and exhaust system of the internal combustion engine.

First, the first embodiment of the present disclosure will be described with reference to FIGS. 1 through 5. FIG. 1 illustrates a schematic configuration of an internal combustion engine to which the exhaust gas control apparatus according to the present embodiment is applied, and an intake and exhaust system of the internal combustion engine. An internal combustion engine 1 illustrated in FIG. 1 is a compression ignition-type internal combustion engine (diesel engine) that uses gas oil as fuel. The internal combustion engine 1 may be a spark ignition-type internal combustion engine (gasoline engine) capable of performing lean combustion operation.

The internal combustion engine 1 is connected to an exhaust passage 2 for circulating burned gas (exhaust gas) discharged from the inside of a cylinder. In some midpoint of the exhaust passage 2, a first catalyst casing 3 is disposed. In a portion of the exhaust passage 2 downstream from the first catalyst casing 3, a second catalyst casing 4 is disposed.

The first catalyst casing 3 houses a catalyst carrier that supports an NSR catalyst, and a particulate filter in a cylindrical casing. The NSR catalyst stores $NO_X$ in exhaust gas when an air-fuel ratio of the exhaust gas is a lean air-fuel ratio. When the air-fuel ratio of the exhaust gas is a rich air-fuel ratio, the NSR catalyst discharges the stored $NO_X$ while causing the stored $NO_X$ to react with reducing components (such as HC and CO) in the exhaust gas so as to reduce the stored $NO_X$ to $N_2$. The particulate filter collects particulate matter (PM) contained in the exhaust gas.

The second catalyst casing 4 houses a catalyst carrier that supports the SCR catalyst in a cylindrical casing. The catalyst carrier is formed by coating, for example, a monolith-type base material with an alumina-based or a zeolite-based catalyst carrier, the base material having a honeycomb-like transverse section. The catalyst carrier supports transition metal elements such as Cu and Fe through ion exchange. The thus-configured SCR catalyst adsorbs $NH_3$ contained in the exhaust gas, and reduces $NO_X$ in the exhaust gas to $N_2$ by using the adsorbed $NH_3$ as a reducing agent. In the present embodiment, copper ions are used as the transition metal ions supported by the catalyst carrier of the SCR catalyst.

The second catalyst casing 4 is annexed with a heater 40 for heating the SCR catalyst. The heater 40 is an electric heating-type heater that heats the SCR catalyst by converting electrical energy into thermal energy. The heater 40 may be an induction heater that heats the SCR catalyst using electromagnetic waves generated by energization. The heater 40 may be implemented by forming the SCR catalyst as an electric heating-type catalyst. The heater 40 may be a burner that heats the SCR catalyst with flames.

In a portion of the exhaust passage 2 between the first catalyst casing 3 and the second catalyst casing 4, an addition valve 5 is disposed for adding (injecting) an additive that is $NH_3$ or a precursor of $NH_3$ into the exhaust gas. The addition valve 5 is connected to an additive tank 51 via a pump 50. The pump 50 sucks the additive stored in the additive tank 51 and pumps the sucked additive to the addition valve 5. The addition valve 5 injects the additive pumped from the pump 50 into the exhaust passage 2. As the additive stored in the additive tank 51, an $NH_3$ gas, or an aqueous solution of urea, ammonium carbamate, or the like may be used. In the present embodiment, the urea water solution is used.

When the urea water solution is injected from the addition valve 5, the urea water solution flows into the second catalyst casing 4 together with the exhaust gas. In that case, the urea water solution is pyrolyzed upon reception of the heat of the exhaust gas, or is hydrolyzed by the SCR catalyst. When the urea water solution is pyrolyzed or hydrolyzed, $NH_3$ is generated. The thus-generated $NH_3$ is adsorbed to the SCR catalyst. The $NH_3$ adsorbed to the SCR catalyst reacts with $NO_X$ contained in the exhaust gas, and generates $N_2$ and $H_2O$.

The thus-configured internal combustion engine 1 is annexed with an ECU 10. The ECU 10 is an electronic control unit including components such as a CPU, a ROM, a RAM, and a backup RAM. The ECU 10 is electrically connected to various sensors such as a first $NO_X$ sensor 6, a second $NO_X$ sensor 7, an exhaust gas temperature sensor 8, a casing temperature sensor 9, a crank position sensor 11, an accelerator position sensor 12, and an air flowmeter 13.

The first $NO_X$ sensor 6 is disposed in a portion of the exhaust passage 2 between the first catalyst casing 3 and the second catalyst casing 4 to output an electrical signal correlated with $NO_X$ concentration of the exhaust gas flowing into the second catalyst casing 4. The second $NO_X$ sensor 7 is disposed in a portion of the exhaust passage 2 downstream from the second catalyst casing 4 to output an electrical signal correlated with the $NO_X$ concentration of the exhaust gas flowing from the second catalyst casing 4. The exhaust gas temperature sensor 8 is disposed in a portion of the exhaust passage 2 downstream from the second catalyst casing 4 to output an electrical signal correlated with the temperature of the exhaust gas flowing from the second catalyst casing 4. The casing temperature sensor 9 is attached to the second catalyst casing 4 to output an electrical signal correlated with the temperature of the casing which houses the SCR catalyst.

The crank position sensor 11 outputs an electrical signal correlated with a rotational position of an output shaft (crankshaft) of the internal combustion engine 1. The accelerator position sensor 12 outputs an electrical signal correlated with an operation amount of an accelerator pedal (accelerator operation amount). The air flowmeter 13 outputs an electrical signal correlated with the amount (mass) of air sucked into the internal combustion engine 1.

The ECU 10 is electrically connected with not only various devices (for example, a fuel injection valve, etc.) attached to the internal combustion engine 1, but also the above-stated component members such as the addition valve 5, the heater 40, and the pump 50. The ECU 10 electrically controls the various devices of the internal combustion engine 1 and the component members such as the addition valve 5, the heater 40, and the pump 50 based on the output signals of the various sensors described before. For example, the ECU 10 executes established control, such as fuel injection control that controls the injection amount and injection timing of the fuel injection valve in accordance with engine load and engine speed of the internal combustion engine 1, and addition control that causes intermittent injection of the additive from the addition valve 5. In addition, the ECU 10 executes recovery processing of the SCR catalyst. The recovery processing stated herein is the processing for recovering the ionic valence of the copper ions included in the SCR catalyst to the valence necessary for $NO_X$ reduction. The recovery processing in the present embodiment will be described below.

Figure 2:
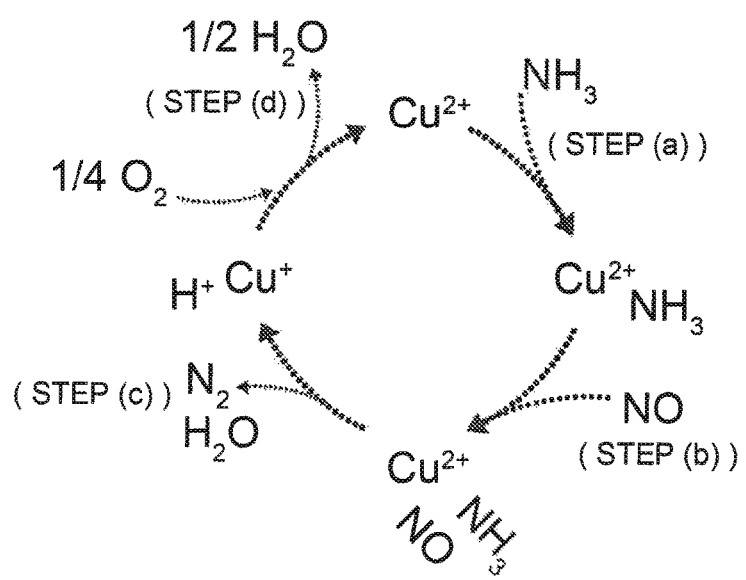
FIG. 2 schematically illustrates a $NO_X$ reduction reaction in a SCR catalyst.

First, the $NO_X$ reduction reaction in the SCR catalyst will be described with reference to FIG. 2. FIG. 2 schematically illustrates the $NO_X$ reduction reaction for the description thereof. The $NO_X$ reduction reaction in the SCR catalyst occurs on the copper ions supported by the catalyst carrier. The $NO_X$ reduction reaction is considered to be schematically divided into four steps (a) to (d). First, in step (a), $NH_3$ is adsorbed to a copper ion ($Cu^{2+}$) whose ionic valence is a value (2+) necessary for $NO_X$ reduction. Next, in step (b), $NO_X$ (NO) is adsorbed to the copper ion. As a result, in step (c), a reaction between $NH_3$ and NO is caused, so that $N_2$ and $H_2O$ are generated and the ionic valence of the copper ion decreases to 1+. When the ionic valence of the copper ion decreases to 1+, the $NO_X$ reduction capacity of the copper ion deteriorates (deteriorated state). However, the hydrogen ion $H^+$ generated in step (c) is adsorbed to the copper ion $C^+$ in the deteriorated state. When oxygen ($¼O_2$) and $NO_2$ are supplied to the copper ion $C^+$ in this state in step (d), the copper ion $C^+$ is re-oxidized. When the copper ion is re-oxidized, the ionic valence of the copper ion is recovered to 2+ that is the value necessary for $NO_X$ reduction (reference state). Consequently, the reaction starting from step (a) can sequentially be continued again, so that continuous $NO_X$ reduction by the SCR catalyst can be achieved.

In order to implement continuous $NO_X$ reduction in the SCR catalyst in this way, it is considered that the valence of the copper ion $C^+$ needs to be recovered ($C^+ \rightarrow Cu^{2+}$) in step (d). However, the valence recovery of the copper ion put in the deteriorated state is exhibited in the atmosphere whose temperature is equal to or above the temperature (active temperature) at which $NO_X$ reduction by the copper ion in the reference state starts to be exhibited, the atmosphere containing $NO_2$ and $O_2$. Accordingly, depending on the operating state of the internal combustion engine 1, the state where the $NO_X$ reduction of the copper ion in the reference state is exhibited but valence recovery of the copper ion in the deteriorated state is not exhibited may continue. For example, when the low load operation of the internal combustion engine 1 continues, or the exhaust gas flowing into the SCR catalyst continues to have an air-fuel ratio equal to or below the stoichiometric air-fuel ratio, there is a high possibility that the state where the $NO_X$ reduction of the copper ion in the reference state is exhibited but valence recovery of the copper ion in the deteriorated state is not exhibited continues. When the internal combustion engine 1 is shut down immediately after such a state is continued, next operation of the internal combustion engine 1 starts in the state where the amount of the copper ions in the reference state is small. As a result, immediately after the internal combustion engine 1 is started, $NO_X$ reduction performance of the SCR catalyst may be deteriorated, and continuous $NO_X$ reduction by the SCR catalyst may become difficult.

Accordingly, in the present embodiment, the recovery processing is executed by a method for controlling the heater 40 such that the temperature of the SCR catalyst is heated to the first temperature or above, and the temperature is maintained for a prescribed period, when $NO_X$ does not flow into the SCR catalyst and $O_2$ is present in the second catalyst casing 4. As described in the foregoing, the first temperature stated herein is the temperature that causes exhibition of the valence recovery of the copper ions in the deteriorated state, the temperature (for example, 200° C. or more) being above the temperature (for example, 150° C. or more) at which $NO_X$ reduction by the copper ions in the reference state starts to be exhibited. The prescribed period is the period necessary for performing valence recovery of substantially the entire copper ions in the deteriorated state. A method for setting the prescribed period will be described later.

Here, the case where $NO_X$ does not flow into the SCR catalyst may be the case where the internal combustion engine is at a shutdown state. However, when execution of the recovery processing is attempted after a relatively long time has elapsed since the shutdown of the internal combustion engine 1, the power consumption of the heater 40 may increase. This is because the temperature of the SCR catalyst decreases as the lapsed time from the shutdown of the internal combustion engine 1 becomes longer, which causes increase in the heating amount needed to raise the temperature of the SCR catalyst to the first temperature or above. Therefore, in the present embodiment, the recovery processing is executed immediately after the shutdown of the internal combustion engine 1, that is, when the SCR catalyst is at a relatively high temperature, by using the shutdown of the internal combustion engine 1 as a trigger.

Figure 3:
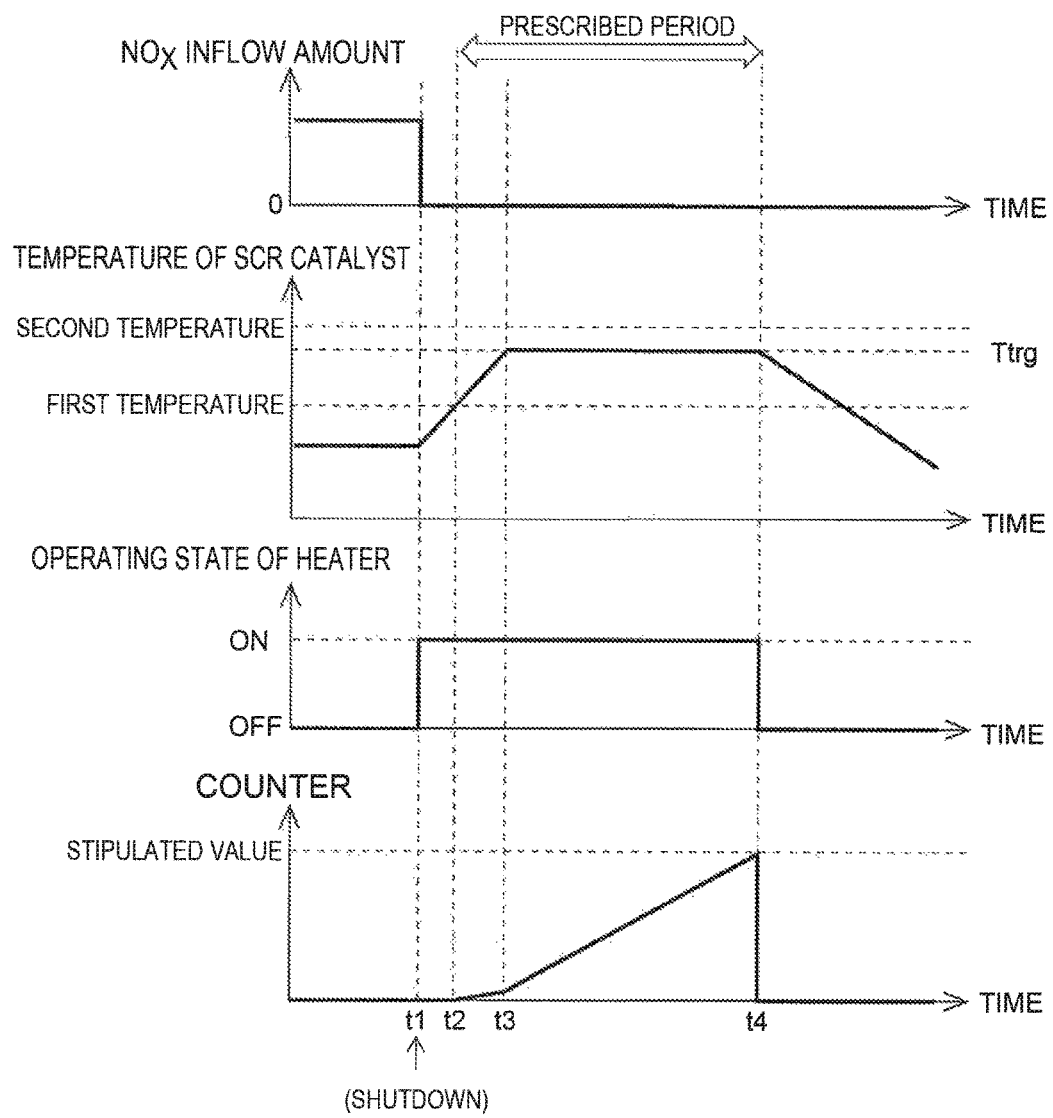
FIG. 3 illustrates the amount of $NO_X$ inflow, the temperature of the SCR catalyst, an operation state of a heater, and temporal change of a counter when the temperature of the SCR catalyst upon shutdown of the internal combustion engine is below the first temperature.

Here, the method for executing the recovery processing will be described with reference to FIG. 3. FIG. 3 illustrates the amount of $NO_X$ flowing into the SCR catalyst ($NO_X$ inflow amount), the temperature of the SCR catalyst, the operation state of the heater 40, and the temporal change of a counter when the internal combustion engine 1 is shut down. A term "counter" in FIG. 3 refers to a counter for integrating the amount of copper ions whose ionic valence is estimated to be recovered per unit time after the shutdown of the internal combustion engine 1. A term "stipulated value" refers to a value corresponding to the amount of the copper ions estimated to be put in the deteriorated state when the internal combustion engine 1 is shut down. In the present embodiment, the stipulated value is set by assuming the case where a maximum amount of the copper ions is put in the deteriorated state when the internal combustion engine 1 is shut down. Such a stipulated value is statistically obtained from the result of an experiment, a simulation, or the like.

As illustrated in FIG. 3, when the internal combustion engine 1 is shut down (t1 in FIG. 3), the amount of $NO_X$ ($NO_X$ inflow amount) flowing into the SCR catalyst is set to "zero." Consequently, the ECU 10 operates (turns on) the heater 40 to heat the SCR catalyst. At that time, since the temperature of the SCR catalyst is relatively high, the SCR catalyst can be heated to the first temperature or above with a heating amount smaller than the case where the SCR catalyst is in a cold state. Once the temperature of the SCR catalyst reaches the first temperature (t2 in FIG. 3), valence recovery of the copper ions in the deteriorated state starts to be exhibited. In this case, since the $NO_X$ inflow amount is "zero", decrease in the ionic valence relating to $NO_X$ reduction by the copper ions in the reference state is not exhibited. As a result, the amount of the copper ions put in the deteriorated state can efficiently be reduced. When the temperature of the SCR catalyst reaches the first temperature, and thereby the valence recovery of the copper ions in the deteriorated state starts to be exhibited, the ECU 10 starts to integrate the amount of copper ions with the counter. Here, the amount of the copper ions whose ionic valence is recovered per unit time becomes larger as the temperature of the SCR catalyst becomes higher. Therefore, a counter update amount per unit time increases more as the temperature of the SCR catalyst becomes higher.

When the heater 40 heats the SCR catalyst and thereby the temperature of the SCR catalyst reaches a target temperature Ttrg that is equal to or above the first temperature (t3 in FIG. 3), the ECU 10 controls the heater 40 such that the temperature of the SCR catalyst is maintained at the target temperature Ttrg. The target temperature Ttrg stated herein is the temperature determined in consideration of a balance between the power consumption and the valence recovery rate, or the like. When the internal combustion engine 1 is shut down, there is a possibility that $NH_3$ adsorbs to at least some of the copper ions contained in the SCR catalyst. Accordingly, when the temperature of the SCR catalyst is excessively raised during execution of the recovery processing, the $NH_3$ adsorbed to the copper ions may desorb or oxidize. However, when there is no gas flow in the SCR catalyst as in the case of after the shutdown of the internal combustion engine 1, the $NH_3$ adsorbed to the copper ion stays in the SCR catalyst even if it desorbs from the copper ion. Accordingly, when the temperature of the SCR catalyst decreases, there is a high possibility that the desorbed $NH_3$ is re-adsorbed to the copper ion. Therefore, it can be said that there is no necessity of restricting the target temperature Ttrg to below the temperature at which $NH_3$ starts to desorb. However, when the temperature of the SCR catalyst is raised to the temperature above the temperature at which $NH_3$ starts to desorb, the $NH_3$ adsorbed to the copper ions may oxidize. Accordingly, the target temperature Ttrg is restricted to temperatures below the temperature (second temperature) at which oxidation of $NH_3$ starts to be exhibited. When the target temperature Ttrg is set in this way, the valence recovery of the copper ions in the deteriorated state can be achieved, without oxidization of the $NH_3$ adsorbed to the copper ions. As a result, when $NO_X$ flows into the SCR catalyst after the next start of the internal combustion engine 1, it becomes possible to reduce $NO_X$ inflow with use of the $NH_3$ adsorbed to the copper ions.

With reference to FIG. 3 again, when the counter value reaches the stipulated value (t4 in FIG. 3), the ECU 10 stops (turns off) the heater 40, while resetting the counter value to "zero." The prescribed period in this case is a period from t2 to t4 in FIG. 3. That is, the prescribed period in this case is a period needed to recover the ionic valence of substantially the entire amount of the copper ions assumed to be put in the deteriorated state at the time when the internal combustion engine 1 is shut down.

The description has been given of the method for executing the recovery processing when the temperature of the SCR catalyst upon shutdown of the internal combustion engine 1 is below the first temperature with reference to FIG. 3. However, the temperature of the SCR catalyst upon shutdown of the internal combustion engine 1 may be equal to or above the first temperature. In such a case, it is estimated that the valence recovery of the copper ions in the deteriorated state is automatically attained before shutdown and immediately after shutdown of the internal combustion engine 1. Accordingly, when the temperature of the SCR catalyst upon shutdown of the internal combustion engine 1 is equal to or above the first temperature, execution of the recovery processing may be prohibited. According to such a method, it becomes possible to suppress increase in the power consumption of the heater 40 attributed to execution of the recovery processing. However, even in the above-stated case, valence recovery of substantially the entire amount of the copper ions put in the deteriorated state is not necessarily automatically performed. As a result, the $NO_X$ reduction performance of the SCR catalyst after the internal combustion engine 1 is started next time may not be a desired performance. Accordingly, in view of more reliably attaining the desired $NO_X$ reduction performance of the SCR catalyst after the internal combustion engine 1 is started next time, the recovery processing may be executed on the assumption that the amount of the copper ions corresponding to the stipulated value are put in the deteriorated state, even in the case where the temperature of the SCR catalyst upon shutdown of the internal combustion engine is the first temperature or above as in the case where the temperature of the SCR catalyst is below the first temperature upon shutdown of the internal combustion engine. In that case, the recovery processing may be executed when the temperature of the SCR catalyst decreases to below the first temperature after the internal combustion engine is shut down.

Figure 4:
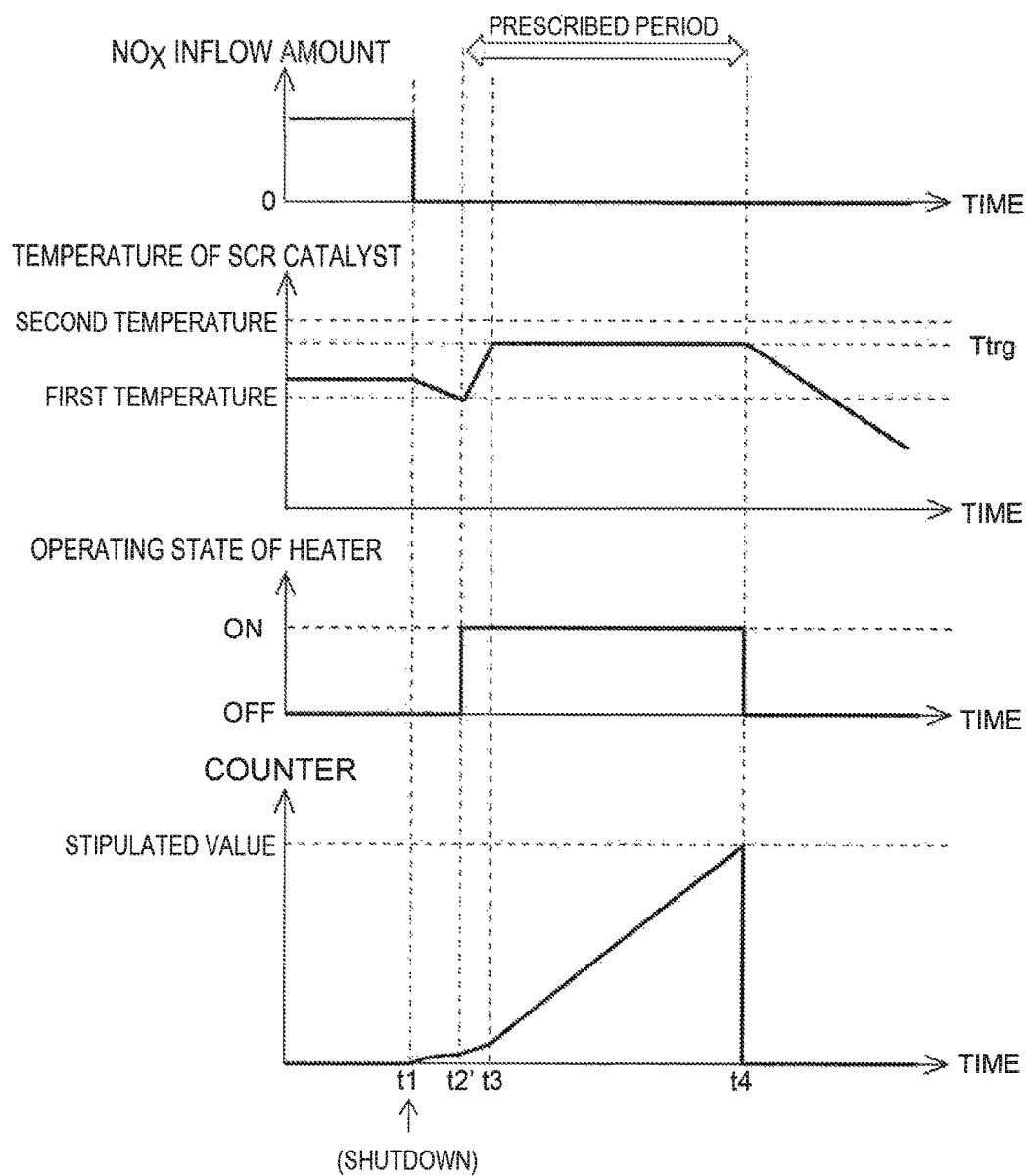
FIG. 4 illustrates the amount of $NO_X$ inflow, the temperature of the SCR catalyst, the operation state of the heater, and the temporal change of the counter when the temperature of the SCR catalyst upon shutdown of the internal combustion engine is the first temperature or above.

Here, the method for executing the recovery processing in the case where the temperature of the SCR catalyst upon shutdown of the internal combustion engine 1 is equal to or above the first temperature will be described with reference to FIG. 4. As illustrated in FIG. 4, when the temperature of the SCR catalyst upon shutdown of the internal combustion engine 1 is equal to or above the first temperature, the valence recovery of the copper ions in the deteriorated state is performed automatically without heating of the SCR catalyst with the heater 40 during the period (automatic recovery period) from a time point (t1 in FIG. 4) when the internal combustion engine 1 is shut down to a time point (t2' in FIG. 4) when the temperature of the SCR catalyst decreases to below the first temperature. Accordingly, when the internal combustion engine 1 is shut down, the ECU 10 starts to integrate the amount of copper ions with the counter without operating the heater 40. Then, when the temperature of the SCR catalyst becomes below the first temperature (t2' in FIG. 4), the ECU 10 operates (turns on) the heater 40.

When the heater 40 heats the SCR catalyst and thereby the temperature of the SCR catalyst reaches the target temperature Ttrg (t3 in FIG. 4), the ECU 10 controls the heater 40 such that the temperature of the SCR catalyst is maintained at the target temperature Ttrg. When the counter value reaches the stipulated value (t4 in FIG. 4), the ECU 10 stops (turns off) the heater 40, while resetting the counter value to "zero." The prescribed period in this case is the period from t2' to t4 in FIG. 4. That is, the prescribed period in this case is the period needed to recover the ionic valence of the amount of copper ions assumed to be put in the deteriorated state at the end of the automatic recovery period (the amount obtained by subtracting the amount of copper ions, whose ionic valence is recovered in the automatic recovery period, from the amount of copper ions assumed to be put in the deteriorated state upon shutdown of the internal combustion engine 1).

As illustrated in FIGS. 3 and 4, when the recovery processing is executed immediately after the shutdown of the internal combustion engine 1, valence recovery of substantially the entire amount of the copper ions in the deteriorated state can be performed, while keeping the power consumption of the heater 40 as low as possible. Since the recovery processing is executed while $NO_X$ does not flow into the SCR catalyst, the valence recovery of the copper ions put in the deteriorated state can also efficiently be performed. Furthermore, since the temperature of the SCR catalyst during the recovery processing is restricted to below the second temperature, valence recovery of the copper ions in the deteriorated state can be performed without oxidizing $NH_3$ that is adsorbed to the copper ions. It is therefore possible to suppress such a situation where $NO_X$ reduction performance of the SCR catalyst is deteriorated or where continuous $NO_X$ reduction by the SCR catalyst is difficult, after the next start of the internal combustion engine 1.

Figure 5:
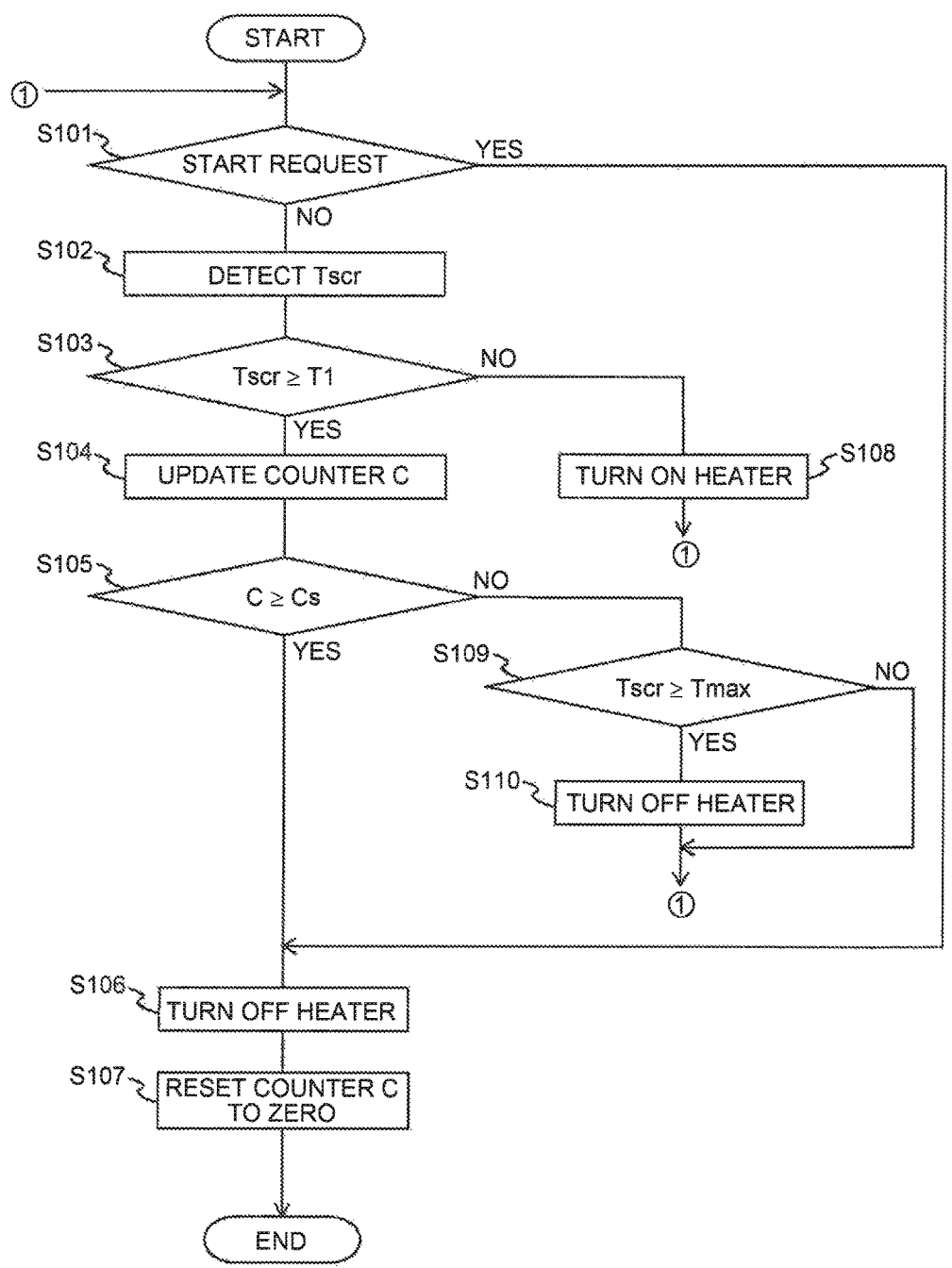
FIG. 5 is a flowchart illustrating a processing routine executed by an ECU when the recovery processing is performed in a first embodiment.

Hereinafter, execution procedures of the recovery processing in the present embodiment will be described with reference to FIG. 5. FIG. 5 is a flowchart illustrating a processing routine executed by the ECU 10 when the recovery processing is performed. The processing routine is prestored in a storage device such as a ROM of the ECU 10, and is executed with the shutdown of the internal combustion engine 1 as a trigger. The shutdown of the internal combustion engine 1 used herein is determined on condition that an ignition switch, which is not illustrated, is switched from ON to OFF. In the configuration of performing so-called stop-start control, in which the internal combustion engine 1 is automatically shut down and restarted while a vehicle is stopped, the internal combustion engine 1 may be determined to be shut down when the internal combustion engine 1 is automatically stopped. In so-called hybrid vehicles including not only the internal combustion engine 1 but also an electric motor or the like as a motor of the vehicle, the internal combustion engine 1 may be determined to be shut down when the internal combustion engine 1 is automatically stopped in order to drive the vehicles with only the electric motor.

In the processing routine of FIG. 5, the ECU 10 first determines whether or not a start request of the internal combustion engine 1 is generated in processing of S101. When positive determination is made in the processing of S101, the ECU 10 proceeds to processing of S102. In the processing of S102, the ECU 10 detects temperature Tscr of the SCR catalyst. When the processing of S102 is executed for the first time after the shutdown of the internal combustion engine 1, the temperature Tscr of the SCR catalyst immediately before the shutdown of the internal combustion engine 1 may be read. Immediately before the shutdown of the internal combustion engine 1, exhaust gas is circulating through the SCR catalyst, and therefore the heat of the SCR catalyst tends to be radiated to the exhaust gas. Accordingly, the temperature Tscr of the SCR catalyst is considered to be correlated with the temperature of the exhaust gas flowing from the SCR catalyst. Therefore, the temperature Tscr of the SCR catalyst calculated from a measurement value of the exhaust gas temperature sensor 8 may be stored in a storage device such as a backup RAM of the ECU 10. When the processing of S102 is executed for the second time or more after the shutdown of the internal combustion engine 1, the ECU 10 calculates the temperature Tscr of the SCR catalyst based on the measurement value of the casing temperature sensor 9. This is because the temperature of the SCR catalyst is considered to be more correlated with the measurement value of the casing temperature sensor 9 than the measurement value of the exhaust gas temperature sensor 8, since the heat of the SCR catalyst tends to be radiated to the casing when there is no gas circulation in the SCR catalyst. In the configuration where the second catalyst casing 4 is equipped with a sensor that directly measures the temperature of the SCR catalyst, the measurement value of the sensor may be used in either of the above-described cases.

In processing of S103, the ECU 10 determines whether or not the temperature Tscr of the SCR catalyst detected in the processing of S102 is equal to or above a first temperature T1. The first temperature T1 is a temperature causing exhibition of the valence recovery of the copper ions in the deteriorated state as described before.

When negative determination is made in the processing of S103, the ECU 10 proceeds to processing of S108. When the processing of S108 is executed for the first time after the shutdown of the internal combustion engine 1, the ECU 10 operates (turns on) the heater 40 by starting to supply driving electric power to the heater 40. When the processing of S08 is executed for the second time or more, the heater 40 is already in an operating state. Accordingly, the ECU 10 may maintain the operating state of the heater 40 by continuously supplying driving electric power to the heater 40. After executing the processing of S108, the ECU 10 returns to processing of S101. In this case, if a restart request of the internal combustion engine 1 is generated, it indicates that positive determination is made in the processing of S101. Accordingly, the ECU 10 proceeds to processing of S106, where the heater 40 is stopped (turned off). Next, the ECU 10 resets a counter value C to "zero", and terminates execution of the present processing routine.

When the temperature Tscr of the SCR catalyst upon shutdown of the internal combustion engine 1 is equal to or above the first temperature T1, or when the temperature Tscr of the SCR catalyst is raised to the first temperature T1 or above by the operation of the heater 40, positive determination is made in the processing of S103. In that case, valence recovery of the copper ions in the deteriorated state is exhibited in the SCR catalyst. Therefore, when positive determination is made in the processing of S103, the ECU 10 proceeds to processing of S104 and updates the value C of the counter. As stated in the description of FIG. 3, the counter is configured to count the integrated amount of the copper ions whose ionic valence is recovered because the temperature of the SCR catalyst becomes equal to or above the first temperature T1 after the shutdown of the internal combustion engine 1. The update amount of the counter value C in the processing of S104 becomes larger as the temperature Tscr of the SCR catalyst becomes higher as described before.

In processing of S105, the ECU 10 determines whether or not the counter value C updated in the processing of S104 is equal to or above a stipulated value Cs. The stipulated value Cs is a value corresponding to the amount of copper ions put in the deteriorated state, at the time when the internal combustion engine 1 is shut down as described before. The stipulated value Cs is preset by assuming the case where a maximum amount of the copper ions is put in the deteriorated state at the time when the internal combustion engine 1 is shut down. When negative determination is made in the processing of S105, valence recovery of the copper ions in the deteriorated state is considered incomplete in the SCR catalyst. Accordingly, the ECU 10 proceeds to processing of S109.

In the processing of S109, the ECU 10 determines whether or not the temperature Tscr of the SCR catalyst detected in the processing of S102 is equal to or above a specified upper limit temperature Tmax. The specified upper limit temperature Tmax used herein is a temperature above the first temperature T1 and below the second temperature (oxidizing temperature of $NH_3$). For example, the specified upper limit temperature Tmax is a temperature obtained by subtracting a specified margin from the second temperature.

When positive determination is made in the processing of S109, the ECU 10 proceeds to processing of S110. In this case, when the heater 40 is in the operating state, the ECU 10 stops the heater 40 so as to suppress the SCR catalyst heated to the second temperature or above. When the heater 40 is already in a stopped state, the ECU 10 maintains the heater 40 in the stopped state.

When negative determination is made in the processing of S109, or after the processing of S110 is executed, the ECU 10 returns to processing of S101.

When positive determination is made in the processing of the S105, valence recovery of substantially the entire amount of the copper ions in the deteriorated state can be considered completed in the SCR catalyst. As a result, the ECU 10 proceeds to the processing of S106, where the heater 40 is stopped (turned off). Next, the ECU 10 proceeds to processing of S107, where the counter value C is reset to "zero", and terminates execution of the present processing routine.

Here, when the ECU 10 executes the processing of S102, "detection means" according to the present disclosure is implemented. When the ECU 10 executes the processing of S103 to S110, "control means" according to the present disclosure is implemented.

When the recovery processing is executed along the procedures described in the foregoing, efficient valence recovery of the copper ions put in the deteriorated state can be performed in the SCR catalyst, while the power consumption of the heater 40 can be kept low. As a result, it becomes possible to suppress such a situation where $NO_X$ reduction performance of the SCR catalyst is deteriorated or where continuous $NO_X$ reduction by the SCR catalyst is difficult after the start of the internal combustion engine 1 next time.

In the present embodiment, the heater 40 is controlled such that the temperature of the SCR catalyst during the recovery processing does not reach the second temperature or above. However, when the temperature of the SCR catalyst upon shutdown of the internal combustion engine 1 is equal to or above the temperature (third temperature) at which $NH_3$ starts to desorb, the temperature of the SCR catalyst during the recovery processing may be raised to the second temperature or above. This is because if the temperature of the SCR catalyst upon shutdown of the internal combustion engine 1 is above the third temperature, it can be assumed that the amount of $NH_3$ adsorbed to the copper ions is substantially zero. When the temperature of the SCR catalyst during the recovery processing is raised to the second temperature or above, the execution period of the recovery processing can be further shortened. As a result, it becomes easy to complete the recovery processing before the restart request is generated.

Modification of First Embodiment

In the first embodiment described in the foregoing, a description has been given of the example of executing recovery processing on the assumption that the amount of the copper ions put in the deteriorated state at the time when the internal combustion engine 1 is shut down is a predetermined fixed amount (the aforementioned stipulated value). However, the amount (requested recovery amount) of the copper ions put in the deteriorated state at the time when the internal combustion engine 1 is shut down may be estimated, and the recovery processing may be executed based on the requested recovery amount.

Figure 6:
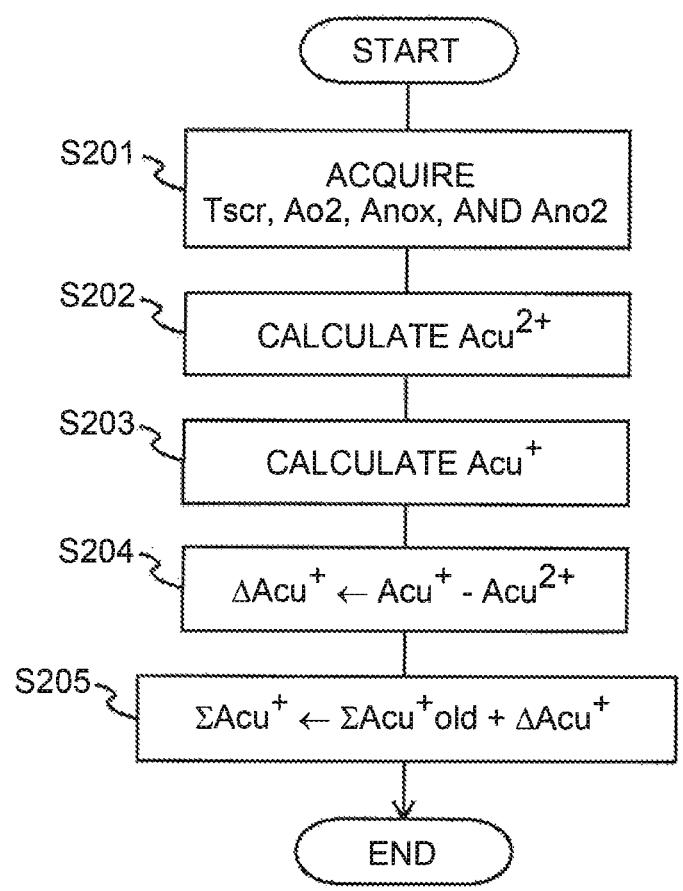
FIG. 6 is a flowchart illustrating a processing routine executed by the ECU when the amount of copper ions in the deteriorated state is calculated.

In the present modification, when the aforementioned requested recovery amount is estimated, the amount of copper ions in the deteriorated state is suitably estimated during operation of the internal combustion engine 1. More specifically, the amount of copper ions in the deteriorated state is obtained by integrating a difference between the amount of copper ions which shifts from the reference state to the deteriorated state per unit time and the amount of copper ions which shifts from the deteriorated state to the reference state per unit time. Here, a description is given of the procedures of calculating the amount of copper ions in the deteriorated state during operation of the internal combustion engine 1 along FIG. 6. FIG. 6 is a flowchart illustrating a processing routine executed by the ECU 10 when the amount of copper ions in the deteriorated state is calculated. The processing routine, which is prestored in a storage device such as a ROM of the ECU 10, is periodically executed during operation of the internal combustion engine 1 (for example, when the ignition switch is in an ON state).

In the processing routine of FIG. 6, first in processing of S201, the ECU 10 acquires the temperature Tscr of the SCR catalyst, an amount Ao2 of $O_2$ flowing into the SCR catalyst ($O_2$ inflow amount) per unit time, an amount ($NO_X$ inflow amount) Anox of $NO_X$ flowing into the SCR catalyst per unit time, and an amount ($NO_2$ inflow amount) Ano2 of $NO_2$ flowing into the SCR catalyst per unit time. Here, the temperature Tscr of the SCR catalyst is calculated based on the measurement value of the exhaust gas temperature sensor 8 as described before. The $O_2$ inflow amount Ao2 is estimated based on the temperature of the NSR catalyst housed in the first catalyst casing 3 and on the operating conditions (for example, intake air amount, fuel injection amount, engine speed, engine temperature, etc.) of the internal combustion engine 1. An $O_2$ concentration sensor may be attached to a portion of the exhaust passage 2 between the first catalyst casing 3 and the second catalyst casing 4 to calculate the $O_2$ inflow amount Ao2 based on a measurement value of the $O_2$ concentration sensor and an exhaust gas flow rate (for example, a sum of the intake air amount and the fuel injection amount). The $NO_X$ inflow amount Anox is calculated based on the measurement value and the exhaust gas flow rate of the first $NO_X$ sensor 6. The $NO_2$ inflow amount Ano2 is calculated based on an $NO_2/NO$ ratio of the $NO_X$ flowing into the SCR catalyst and on the $NO_X$ inflow amount Anox. For example, the $NO_2/NO$ ratio of $NO_X$ flowing into the SCR catalyst is estimated using the temperature of the NSR catalyst and the operating conditions (engine speed, engine load, etc.) of the internal combustion engine 1 as a parameter.

In the processing of S202, the ECU 10 calculates the amount (recovered ion amount) $Acu^{2+}$ of copper ions which shifts from the deteriorated state to the reference state per unit time. As described before, when the temperature of the SCR catalyst is equal to or above the first temperature, and $O_2$ or $NO_2$ is present in the SCR catalyst, valence recovery of the copper ion in the deteriorated state is exhibited. Therefore, it can be said that the recovered ion amount $Acu^{2+}$ is correlated with the temperature Tscr, the $O_2$ inflow amount Ao2, and the $NO_2$ inflow amount Ano2 of the SCR catalyst. In the present modification, the correlation data is obtained based on the result of an experiment or a simulation, and the obtained correlation data is stored as a map. In the processing of S202, the ECU 10 derives the recovered ion amount $Acu^{2+}$ by accessing the map using as an argument the temperature Tscr, the $O_2$ inflow amount Ao2, and the $NO_2$ inflow amount Ano2 of the SCR catalyst acquired in the processing of the S201.

In processing of S203, the ECU 10 calculates the amount (deteriorated ion amount) $Acu^+$ of the copper ions which shift from the reference state to the deteriorated state per unit time. $NO_X$ reduction by the copper ions $Cu^{2+}$ in the reference state is exhibited when the temperature Tscr of the SCR catalyst is equal to or above the active temperature, and $NO_X$ flows into the SCR catalyst. Therefore, it can be said that the deteriorated ion amount $Acu^+$ is correlated with the temperature Tscr and the $NO_X$ inflow amount Anox of the SCR catalyst. In the present modification, the correlation data is obtained based on the result of an experiment or a simulation, and the obtained correlation data is stored as a map. In the processing of S203, the ECU 10 derives the deteriorated ion amount $Acu^+$ by accessing the map using the temperature Tscr, and the $NO_2$ inflow amount Anox of the SCR catalyst acquired in the processing of the S201 as an argument.

In processing of S204, the ECU 10 calculates a variation $\Delta Acu^+$ ($=Acu^+ - Acu^{2+}$) in the amount of copper ions in the deteriorated state per unit time by subtracting the recovered ion amount $Acu^{2+}$ calculated in the processing of S202 from the deteriorated ion amount $Acu^+$ calculated in the processing of S203. Here, when the deteriorated ion amount $Acu^+$ is larger than the recovered ion amount $Acu^{2+}$, the variation $\Delta Acu^+$ become a positive value. When the recovered ion amount $Acu^{2+}$ is larger than the deteriorated ion amount $Acu^+$, the variation $\Delta Acu^+$ becomes a negative value.

In the processing of S205, an amount $\Sigma Acu^+$ of copper ions put in the deteriorated state at the time is calculated. Specifically, the ECU 10 calculates the amount $\Sigma Acu^+$ of copper ions put in the deteriorated state at the time by adding the variation $\Delta Acu^+$ calculated in the processing of S204 to a previous value $\Sigma Acu^+ old$ of the amount of copper ions put in the deteriorated state. The thus-calculated amount $\Sigma Acu^+$ of copper ions is stored in the backup RAM that can retain data after the shutdown of the internal combustion engine 1.

Figure 7:
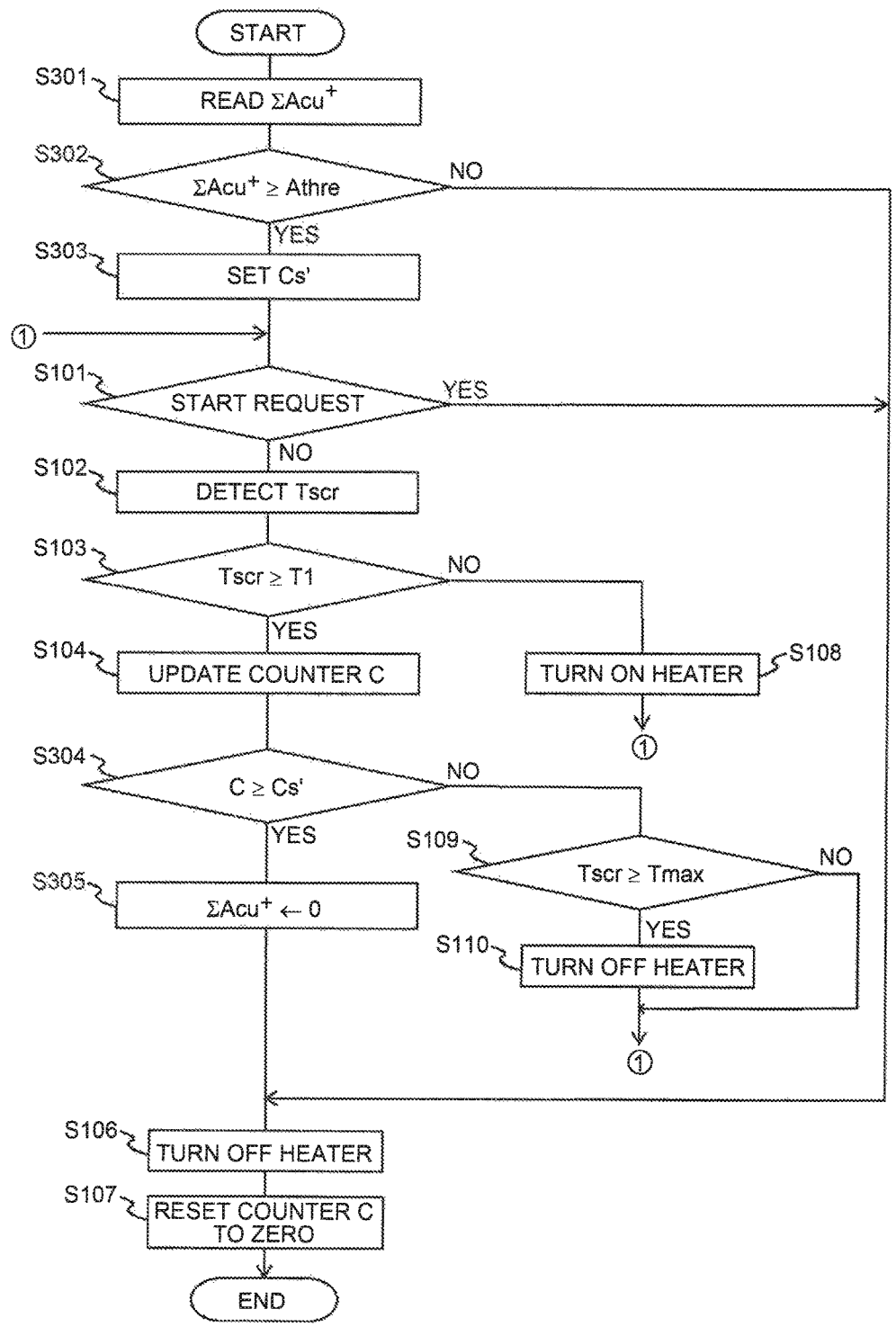
FIG. 7 is a flowchart illustrating a processing routine executed by the ECU when the recovery processing is performed in a modification of the first embodiment.

Next, execution procedures of the recovery processing in the present modification will be described with reference to FIG. 7. FIG. 7 is a flowchart illustrating a processing routine executed by the ECU 10 when the recovery processing is executed. The processing routine is executed with the shutdown of the internal combustion engine 1 as a trigger as in the processing routine of the FIG. 5 described before. The processing steps in FIG. 7 similar to those in the processing routine of the FIG. 5 are designated by similar reference signs. In the processing routine of FIG. 7, processing of S301 to S303 is executed before the processing of S101 in the processing routine of FIG. 5. In the processing routine of FIG. 7, the processing of S105 in the processing routine of FIG. 5 is replaced with processing of S304 to S305.

First, in processing of S301, the ECU 10 reads from the backup RAM the value $\Sigma Acu^+$ calculated in the processing routine of FIG. 6 immediately before the shutdown of the internal combustion engine 1. The value $\Sigma Acu^+$ corresponds to the amount of copper ions (requested recovery amount) put in the deteriorated state upon shutdown of the internal combustion engine 1.

In processing of S302, the ECU 10 determines whether or not the requested recovery amount $\Sigma Acu^+$ read in the processing of the S301 is equal to or above a specified threshold Athre. The specified threshold Athre used herein is the amount set on the assumption that when the internal combustion engine 1 is restarted while the copper ions below the specified threshold Athre are put in the deteriorated state, the SCR catalyst can provide a desired $NO_X$ reduction performance or higher, or the amount set on the assumption that continuous $NO_X$ reduction by the SCR catalyst can be performed. When negative determination is made in the processing of S302, the ECU 10 executes the processing of S106 and S107 in sequence, and terminates execution of the present processing routine. That is, the recovery processing is not executed when negative determination is made in the processing of S302. When positive determination is made in the processing of S302, the ECU 10 proceeds to processing of S303

In the processing of S303, the ECU 10 sets a stipulated value Cs' used in later-described processing of S304 using the requested recovery amount $\Sigma Acu^+$ read in the processing of S301 as a parameter. Specifically, the ECU 10 sets the stipulated value Cs' to a value identical to the requested recovery amount $\Sigma Acu^+$. Alternatively, the stipulated value Cs' may be set to a value obtained by subtracting the specified threshold Athre from the requested recovery amount $\Sigma Acu^+$.

The ECU 10 executes the processing of S101 to S103 in sequence after the processing of S303 is executed. In this case, when positive determination is made in the processing of S103, the ECU 10 executes the processing of S104 and the processing of S304 in sequence. In the processing of S304, the ECU 10 determines whether or not the counter value C is equal to or above the stipulated value Cs' set in the processing of S303. When positive determination is made in the processing of S304, the ECU 10 proceeds to the processing of S305. In the processing of S305, the ECU 10 resets the value $\Sigma Acu^+$ stored in the backup RAM to "zero". Then, the ECU 10 executes the processing of S106 and the processing of S107 in sequence, so that the recovery processing is terminated.

When the recovery processing is executed along such procedures, the period (prescribed period) in which the heater 40 maintains the SCR catalyst at or above the first temperature T1 is changed in accordance with the amount of copper ions (requested recovery amount) $\Sigma Acu^+$ put in the deteriorated state at the time when the internal combustion engine 1 is shut down. That is, in the case where the requested recovery amount $\Sigma Acu^+$ is small, the prescribed period is shortened as compared with the case where the requested recovery amount $\Sigma Acu^+$ is large. As a result, it becomes possible to achieve valence recovery of the copper ions put in the deteriorated state, while keeping the power consumption of the heater 40 to necessary minimum. When the requested recovery amount $\Sigma Acu^+$ is below the specified threshold Athre, the recovery processing is not executed. Accordingly, the unnecessary operation of the heater 40 can also be suppressed.

Second Embodiment

Figure 9:
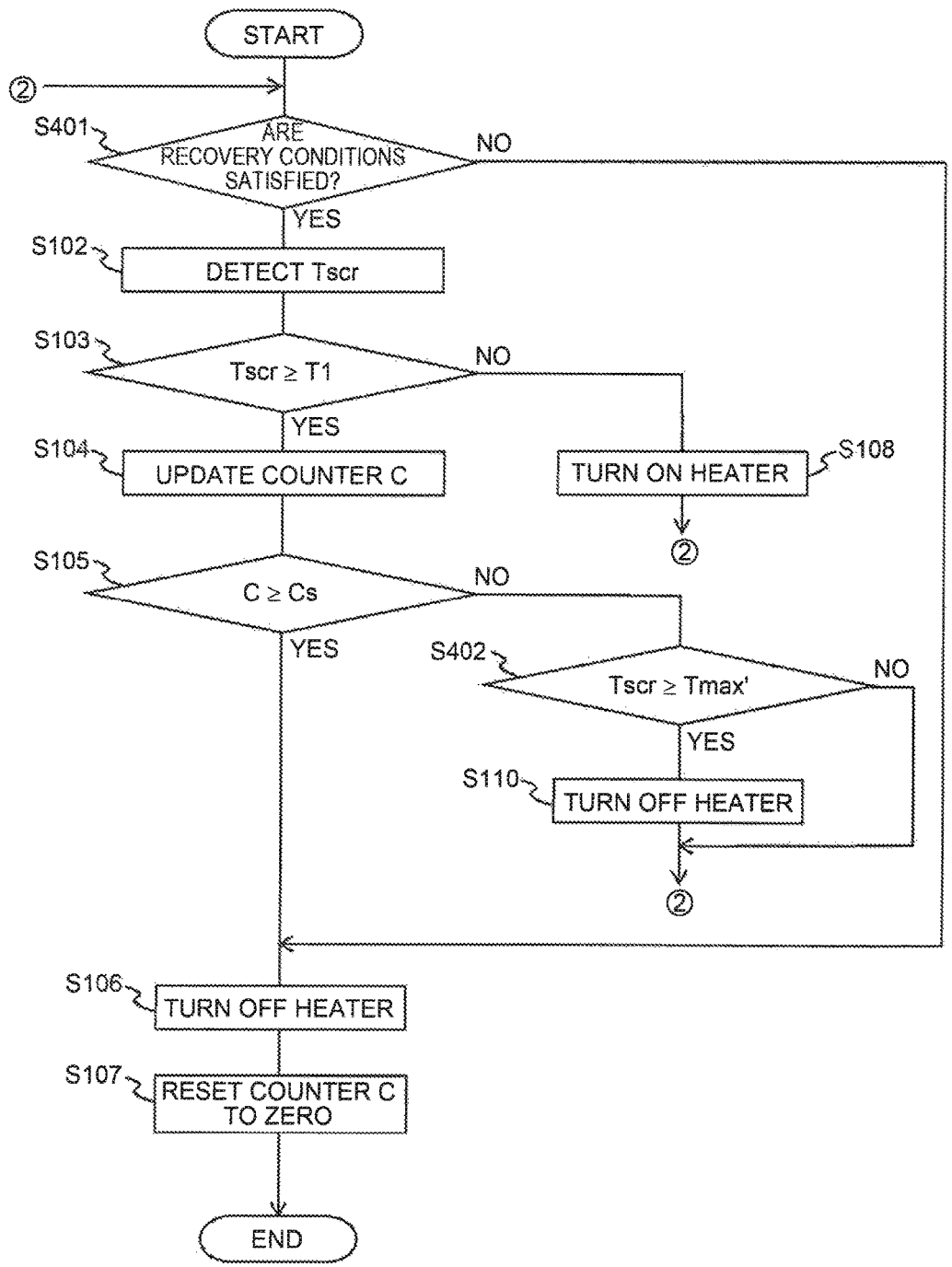
FIG. 9 is a flowchart illustrating a processing routine executed by the ECU when the recovery processing is performed in a second embodiment.
Figure 10:
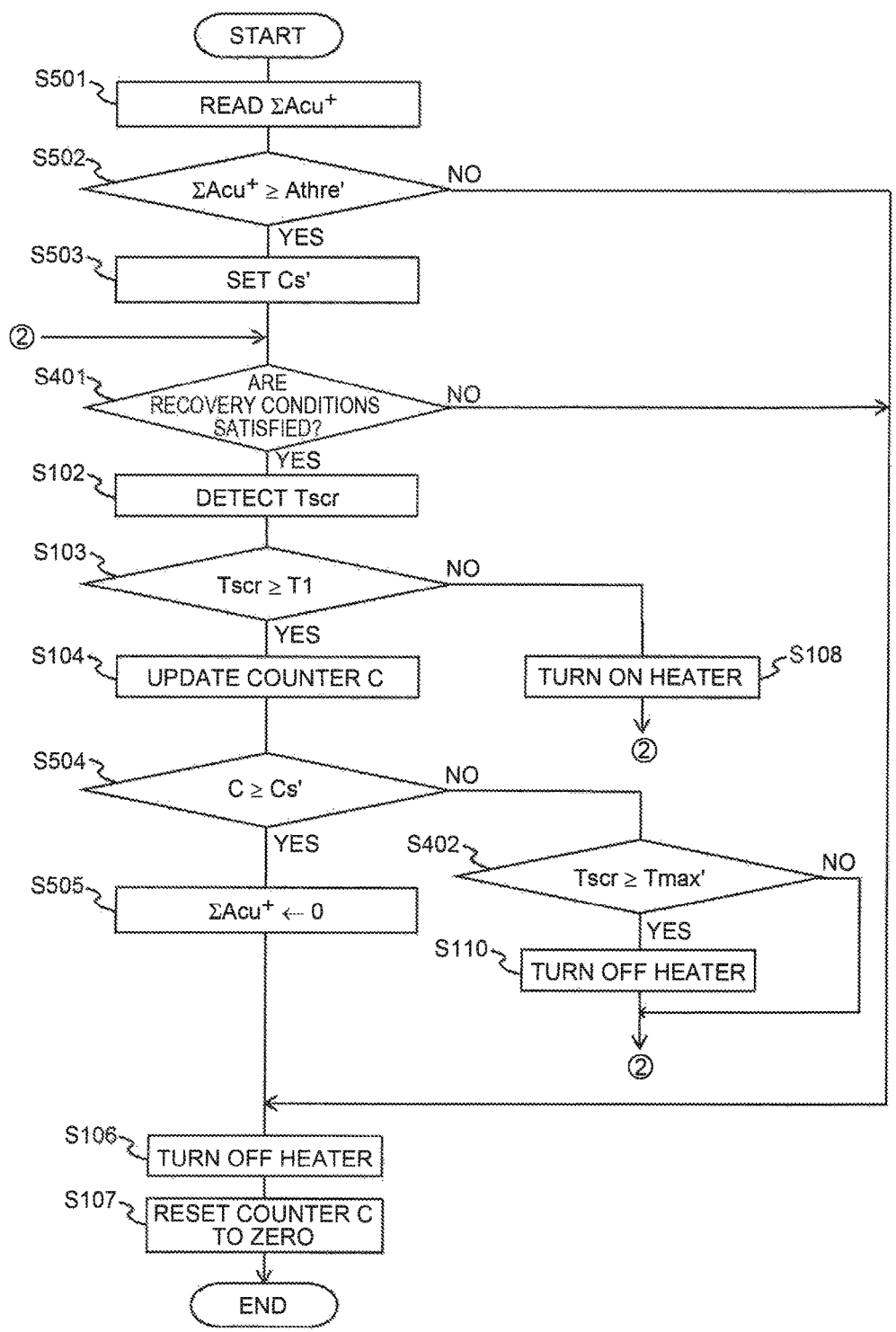
FIG. 10 is a flowchart illustrating a processing routine executed by the ECU when the recovery processing is performed in a modification of the second embodiment.

Now, a second embodiment of the present disclosure will be described with reference to FIGS. 8 to 10. Here, configuration aspects other than those described in the first embodiment will be described, while a description of similar configuration aspects is omitted. In the above-stated first embodiment, the case where the internal combustion engine 1 is shut down is used as an example of the case where $NO_X$ does not flow into the SCR catalyst. In the present embodiment, the case where a gas that does not contain $NO_X$ flows into the SCR catalyst is used as an example. The gas that does not contain $NO_X$ used herein may include not only a gas that does not contain $NO_X$ at all but also a gas containing an acceptable amount of $NO_X$ (the amount considered to be small enough to allow efficient valence recovery of the transition metal ions put in the deteriorated state in the SCR catalyst).

Examples of the case where the gas that does not contain $NO_X$ flows into the SCR catalyst include the case where substantially the entire amount of $NO_X$ discharged from the internal combustion engine 1 during operation of the internal combustion engine 1 is stored in the NSR catalyst in the first catalyst casing 3, and the case where fuel-cut processing is executed. The case where substantially the entire amount of $NO_X$ discharged from the internal combustion engine 1 is stored in the NSR catalyst may be the case where the air-fuel ratio of the exhaust gas flowing into the NSR catalyst is a lean air-fuel ratio. However, even when the exhaust gas flowing into the NSR catalyst has a lean air-fuel ratio, part of $NO_X$ flowing into the NSR catalyst tends to slip through the NSR catalyst if the $NO_X$ storage amount of the NSR catalyst is relatively large. Therefore, in the present embodiment, when the $NO_X$ storage amount of the NSR catalyst is equal to or below a specified upper limit, and the air-fuel ratio of the exhaust gas flowing into the NSR catalyst is a lean air-fuel ratio, it is determined that the gas that does not contain $NO_X$ flows into the SCR catalyst. The term "specified upper limit" used herein is a value set on the assumption that if the $NO_X$ storage amount of the NSR catalyst exceeds the specified upper limit, the amount of $NO_X$ beyond the aforementioned acceptable $NO_X$ amount can slip through the NSR catalyst. Such a specified upper limit is predetermined based on the result of an experiment or a simulation.

Now, when the recovery processing is executed while the gas that does not contain $NO_X$ flows through the SCR catalyst, $NH_3$ adsorbed to the copper ion may desorb and flow out from the SCR catalyst together with the gas. Here, the relation among the temperature of the SCR catalyst, the amount of copper ions (valence recovery rate) whose ionic valence is recovered per unit time, the amount of $NH_3$ (desorption rate) desorbed from the copper ions per unit time, and the amount (oxidation rate) of $NH_3$ oxidized per unit time, is illustrated in FIG. 8. A solid line in FIG. 8 represents the valence recovery rate of the copper ions. A dashed dotted line in FIG. 8 represents the oxidation rate of $NH_3$. A two-dot chain line in FIG. 8 represents the desorption rate of $NH_3$.

Figure 8:
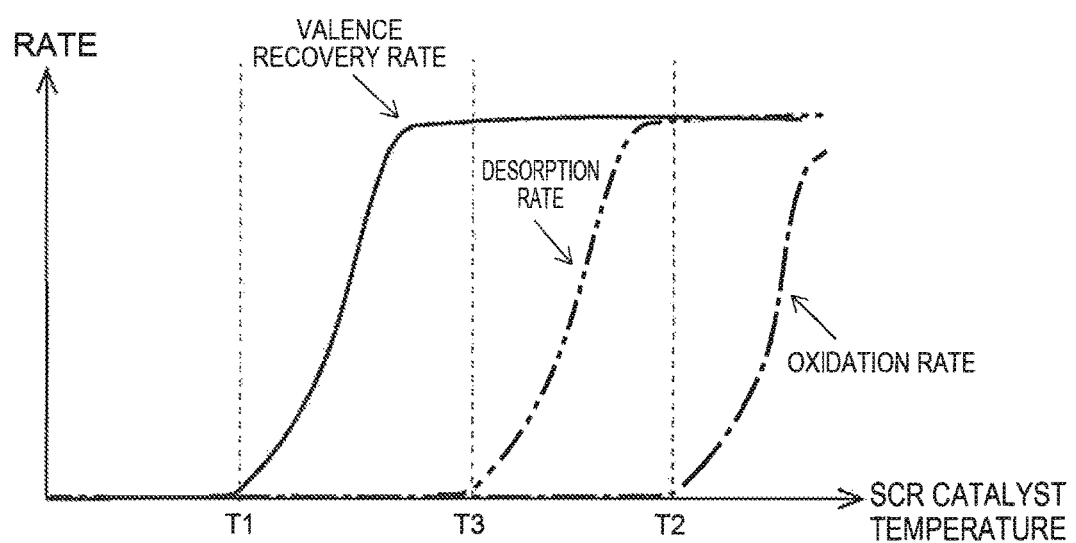
FIG. 8 illustrates the relation among the temperature of the SCR catalyst, a valence recovery rate of the copper ions in the deteriorated state, a desorption rate of $NH_3$, and an oxidation rate of $NH_3$.

As illustrated in FIG. 8, when the temperature of the SCR catalyst becomes T3 (third temperature) or above, desorption of $NH_3$ adsorbed to the copper ions starts to be exhibited. The third temperature T3 is above the temperature (first temperature) T1 at which valence recovery of the copper ions in the deteriorated state starts to be exhibited, and below the temperature (second temperature) T2 at which $NH_3$ starts to oxidize. Accordingly, as in the aforementioned first embodiment, even when the temperature of the SCR catalyst during the recovery processing is restricted to below the second temperature T2, the temperature of the SCR catalyst may become the third temperature T3 or above. When the temperature of the SCR catalyst becomes the third temperature T3 or above while the gas that does not contain $NO_X$ flows through the SCR catalyst, the $NH_3$ desorbed from the copper ions tends to flow out from the SCR catalyst with the gas. Accordingly, even when the temperature of the SCR catalyst decreases to the third temperature T3 or below after the valence recovery processing is terminated, the desorbed $NH_3$ is less likely to be re-adsorbed to the copper ions.

Accordingly, in the recovery processing of the present embodiment, the temperature of the SCR catalyst is restricted to below the third temperature T3. When the temperature of the SCR catalyst during the recovery processing is restricted to below the third temperature, it is possible to suppress the situation where the $NH_3$ adsorbed to the copper ions at the start of the recovery processing desorbs and flows out from the SCR catalyst. As a result, when the gas containing $NO_X$ flows into the SCR catalyst after the end of the recovery processing, it becomes possible to reduce $NO_X$ in the exhaust gas by using the adsorbed $NH_3$.

Hereinafter, execution procedures of the recovery processing in the present embodiment will be described with reference to FIG. 9. FIG. 9 is a flowchart illustrating a processing routine executed by the ECU 10 when the recovery processing is executed. Here, the recovery processing is executed on the assumption that the amount of copper ions put in the deteriorated state upon start of the recovery processing is a stipulated value (value set on the assumption that a maximum amount of copper ions is put in the deteriorated state) similar to the stipulated value in the first embodiment. The processing steps in FIG. 9 similar to those in the processing routine of FIG. 5 are designated by similar reference signs. In the processing routine of FIG. 9, the processing of S101 in the processing routine of FIG. 5 is replaced with processing of S401. Furthermore, in the processing routine of FIG. 9, the processing of S109 in the processing routine of FIG. 5 is replaced with processing of S402.

First, in the processing of S401, the ECU 10 determines whether or not recovery conditions are satisfied. Specifically, if the $NO_X$ storage amount of the NSR catalyst is below the specified upper limit, and the air-fuel ratio of the exhaust gas flowing into the NSR catalyst is a lean air-fuel ratio, the ECU 10 determines that the recovery conditions are satisfied. When the fuel-cut processing of the internal combustion engine 1 is during execution, the ECU 10 also determines that the recovery conditions are satisfied.

When positive determination is made in the processing of S401, the ECU 10 executes the processing of S102 and onward. When negative determination is made in the processing of S103, the ECU 10 executes the processing of S108. In the present embodiment, when the heater 40 is operated in the processing of S108, an energizing amount of the heater 40 may be regulated in accordance with the amount of gas flowing through the SCR catalyst. That is, in the case where the amount of gas flowing through the SCR catalyst is small, the energizing amount of the heater 40 may be decreased as compared with the case where the amount of gas flowing through the SCR catalyst is large. This is because in the case where the amount of gas flowing through the SCR catalyst is small, the amount of heat radiated from the SCR catalyst to the gas is decreased as compared with the case where the amount of gas flowing through the SCR catalyst is large, so that the SCR catalyst can be heated with a smaller energizing amount. When execution of the processing of S108 is ended, the ECU 10 returns to the processing of S401.

When negative determination is made in the processing of S105, the ECU 10 proceeds to the processing of S402, where it is determined whether or not the temperature Tscr of the SCR catalyst is equal to or above a specified upper limit temperature Tmax'. The specified upper limit temperature Tmax' used herein is a temperature obtained by subtracting a specified margin from the third temperature T3. When positive determination is made in the processing of S402, the ECU 10 stops (turns off) the heater 40 in the processing of S110 so as to suppress the temperature Tscr of the SCR catalyst increasing to the third temperature T3 or above. When execution of the processing of S110 is terminated, the ECU 10 returns to the processing of S402. When negative determination is made in the processing of S402, the ECU 10 skips the processing of S110 and returns to the processing of S401.

When the recovery processing is executed in such a procedure, valence recovery of the copper ions in the deteriorated state can be performed even while the gas flowing through the SCR catalyst. According to the above-stated procedures, it becomes possible to perform recovery processing two or more times during one trip. As a consequence, it is easy to maintain the amount of copper ions in the deteriorated state to be small. As a result, it becomes easy to maintain the $NO_X$ reduction performance of the SCR catalyst to be a desired performance or higher, and to implement continuous $NO_X$ reduction by the SCR catalyst.

In the present embodiment, the heater 40 is controlled such that the temperature of the SCR catalyst during the recovery processing does not reach the third temperature or above. However, the amount of $NH_3$ adsorbed to the transition metal ions can be regarded as substantially zero, when the temperature of the SCR catalyst at the time when the recovery processing is started is the third temperature or above. Accordingly, the temperature of the SCR catalyst during the recovery processing may be raised to the second temperature or above, the second temperature being higher than the third temperature. In that case, the execution period of the recovery processing can be shortened more. As a result, the amount of copper ions in the deteriorated state can more reliably be reduced even in a relatively short period such as in the fuel-cut processing.

Moreover, immediately after the air-fuel ratio of the exhaust gas flowing into the NSR catalyst switches from the rich air-fuel ratio to the lean air-fuel ratio, such as immediately after the end of S regeneration which is the processing for eliminating sulfur poisoning of the NSR catalyst, and immediately after the end of rich spike processing which is the processing for reducing and removing $NO_X$ stored in the NSR catalyst, $O_2$ in exhaust gas is stored in the NSR catalyst due to oxygen storage capacity (OSC) of the NSR catalyst. As a result, the air-fuel ratio of the exhaust gas flowing into the SCR catalyst may become an air-fuel ratio in the vicinity of the stoichiometric air-fuel ratio. When the recovery processing is performed under such circumstances, $O_2$ necessary for valence recovery of the copper ions put in the deteriorated state runs short, which may make it difficult to efficiently recover the ionic valence of the copper ions in the deteriorated state. Therefore, immediately after switching the air-fuel ratio of the exhaust gas flowing into the NSR catalyst from the rich air-fuel ratio to the lean air-fuel ratio, such as immediately after the end of S regeneration and immediately after the end of rich spike processing, execution of the recovery processing may be prohibited.

Modification of Second Embodiment

In the second embodiment described in the foregoing, the description has been given of the example of executing recovery processing on the assumption that the amount of the copper ions in the deteriorated state at the time when the recovery conditions are satisfied is a predetermined fixed amount (the stipulated value). However, the recovery processing may be executed based on the amount (requested recovery amount) of the copper ions put in the deteriorated state at the time when recovery conditions are satisfied.

Hereinafter, execution procedures of the recovery processing in the present modification will be described with reference to FIG. 10. FIG. 10 is a flowchart illustrating a processing routine executed by the ECU 10 when the recovery processing is executed. The processing steps in FIG. 10 similar to those in the processing routine of the FIG. 9 are designated by similar reference signs. In the processing routine of FIG. 10, processing of S501 to S503 is executed before the processing of S401 in the processing routine of FIG. 9. In the processing routine of FIG. 10, the processing of S105 in the processing routine of FIG. 9 is replaced with processing of S504 to S505.

First in the processing of S501, the ECU 10 reads the amount of copper ions (requested recovery amount) $\Sigma Acu^+$ put in the deteriorated state at the time. The requested recovery amount $\Sigma Acu^+$ is stored in the backup RAM when the processing similar to the processing routine of FIG. 6 described before is executed.

In the processing of S502, the ECU 10 determines whether or not the requested recovery amount $\Sigma Acu^+$ read in the processing of the S501 is equal to or above a specified threshold Athre'. The specified threshold Athre' used herein is the amount provided on the assumption that the $NO_X$ reduction performance of the SCR catalyst becomes a desired performance or higher, and the continuous $NO_X$ reduction by the SCR catalyst is achieved, even when $NO_X$ flows into the SCR catalyst while the amount of the copper ions less than the specified threshold Athre' are put in the deteriorated state. When negative determination is made in the processing of S502, the ECU 10 executes the processing of S106 and S107 in sequence, and terminates execution of the present processing routine. That is, the recovery processing is not executed when negative determination is made in the processing of S502. When positive determination is made in the processing of S502, the ECU 10 proceeds to processing of S503

In the processing of S503, the ECU 10 sets a stipulated value Cs' used in later-described processing of S504 using the requested recovery amount $\Sigma Acu^+$ read in the processing of S501 as a parameter. Specifically, the ECU 10 sets the stipulated value Cs' to a value identical to the requested recovery amount $\Sigma Acu^+$. Alternatively, the stipulated value Cs' may be set to a value obtained by subtracting the specified threshold Athre' from the requested recovery amount $\Sigma Acu^+$.

The ECU 10 executes the processing of S401, S102, S103 in sequence after the processing of S503 is executed. In this case, when positive determination is made in the processing of S103, the ECU 10 executes the processing of S104 and the processing of S504 in sequence. In the processing of S504, the ECU 10 determines whether or not the counter value C is equal to or above the stipulated value Cs' set in the processing of S503. When positive determination is performed in the processing of S504, the ECU 10 proceeds to the processing of S505, where the value of ΣAcu⁺ stored in the backup RAM is reset to "zero." Then, the ECU 10 executes the processing of S106 and the processing of S107 in sequence, so that the recovery processing is terminated.

When the recovery processing is executed along such procedures, the period (prescribed period) in which the heater 40 maintains the SCR catalyst at or above the first temperature T1 is changed in accordance with the amount of copper ions (requested recovery amount) ΣAcu⁺ put in the deteriorated state at the time when the recover conditions are satisfied. As a result, it becomes possible to achieve valence recovery of substantially the entire amount of the copper ions put in the deteriorated state, while keeping the power consumption of the heater 40 to necessary minimum. When the requested recovery amount ΣAcu⁺ is below the specified threshold Athre', the recovery processing is not executed. Accordingly, the unnecessary operation of the heater 40 can also be suppressed.

Other Embodiments

In the first and second embodiments described in the foregoing, the examples of using the copper ions as the transition metal ions supported by the SCR catalyst have been described. However, when the iron ions are supported on the SCR catalyst, the recovery processing can be executed by the same method. In the SCR catalyst including iron ions, $NH_3$ adsorbed to the iron ions ($Fe^{3+}$) having an ionic valence (3+) that is necessary for $NO_X$ reduction reacts with $NO_X$ in exhaust gas, so that the valence of the iron ions decreases from 3+ to 2+. The iron ions ($Fe^{2+}$) put in the deteriorated state in this way are re-oxidized when hydrogen ions ($H^+$) adsorbed to the iron ions reacts with oxygen ($\frac{1}{4}O_2$), so that the ionic valence of the iron ions is recovered to the ionic valence (3+) necessary for $NO_X$ reduction. Therefore, when the recovery processing is executed in the SCR catalyst that supports the copper ions while $NO_X$ does not flow into the SCR catalyst and $O_2$ is present in the SCR catalyst, valence recovery of substantially the entire amount of the iron ions put in the deteriorated state can be achieved. However, since the temperature that causes exhibition of valence recovery of the iron ions is above the temperature that causes exhibition of valence recovery of the copper ions (for example, about 300° C.), the target temperature Ttrg may be set accordingly. The embodiment of the present disclosure may be defined as follows. An exhaust gas control apparatus for an internal combustion engine, the exhaust gas control apparatus includes: a selective catalytic reduction catalyst disposed in an exhaust passage of the internal combustion engine, the selective catalytic reduction catalyst including transition metal ions for reducing $NO_X$ in exhaust gas with $NH_3$ as a reducing agent; a heater configured to heat the selective catalytic reduction catalyst; and an electronic control unit configured to detect temperature of the selective catalytic reduction catalyst, and execute recovery processing when $NO_X$ does not flow into the selective catalytic reduction catalyst and the temperature of the selective catalytic reduction catalyst is below a first temperature that is a temperature causing exhibition of valence recovery of the transition metal ions, the recovery processing being processing of controlling the heater so as to heat the selective catalytic reduction catalyst up to the first temperature or above and to maintain the selective catalytic reduction catalyst at or above the first temperature for a prescribed period.

What is claimed is:

1. An exhaust gas control apparatus for an internal combustion engine, the exhaust gas control apparatus comprising:
   a selective catalytic reduction catalyst disposed in an exhaust passage of the internal combustion engine, the selective catalytic reduction catalyst including transition metal ions for reducing $NO_X$ in exhaust gas with $NH_3$ as a reducing agent;
   a heater configured to heat the selective catalytic reduction catalyst; and
   an electronic control unit configured to
      detect temperature of the selective catalytic reduction catalyst, and
      execute recovery processing when $NO_X$ does not flow into the selective catalytic reduction catalyst and the temperature of the selective catalytic reduction catalyst is below a first temperature that is a temperature causing exhibition of valence recovery of the transition metal ions, the recovery processing being processing of controlling the heater so as to heat the selective catalytic reduction catalyst up to the first temperature or above and to maintain the selective catalytic reduction catalyst at or above the first temperature for a prescribed period.

2. The exhaust gas control apparatus according to claim 1, wherein
   the electronic control unit is configured to execute the recovery processing with shutdown of the internal combustion engine as a trigger.

3. The exhaust gas control apparatus according to claim 2, wherein
   the electronic control unit is configured to control the heater such that the temperature of the selective catalytic reduction catalyst during execution of the recovery processing becomes equal to or above the first temperature and below a second temperature, the second temperature being a temperature that causes exhibition of $NH_3$ oxidation.

4. The exhaust gas control apparatus according to claim 3, wherein
   the electronic control unit is configured to
   control the heater such that the temperature of the selective catalytic reduction catalyst during execution of the recovery processing becomes equal to or above the first temperature and below the second temperature, when the temperature of the selective catalytic reduction catalyst upon the shutdown of the internal combustion engine is below a third temperature, and
   control the heater such that the temperature of the selective catalytic reduction catalyst during execution of the recovery processing becomes equal to or above the second temperature, when the temperature of the selective catalytic reduction catalyst upon the shutdown of the internal combustion engine is equal to or above the third temperature, and
   the third temperature is a temperature below the second temperature, the third temperature causing exhibition of $NH_3$ desorption.

5. The exhaust gas control apparatus according to claim 1, wherein
   the electronic control unit is configured to execute the recovery processing when the temperature of the selective catalytic reduction catalyst is below the first temperature while fuel-cut processing of the internal combustion engine is under execution.

6. The exhaust gas control apparatus according to claim 1, further comprising:
a $NO_X$ storage reduction catalyst disposed in a portion of the exhaust passage upstream from the selective catalytic reduction catalyst, the $NO_X$ storage reduction catalyst being configured to store $NO_X$ in the exhaust gas when an air-fuel ratio of the exhaust gas is a lean air-fuel ratio above a stoichiometric air-fuel ratio, and reduce, while emitting, the stored $NO_X$ when the air-fuel ratio of the exhaust gas is a rich air-fuel ratio below the stoichiometric air-fuel ratio, wherein
the electronic control unit is configured to execute the recovery processing during operation of the internal combustion engine, when the air-fuel ratio of the exhaust gas flowing into the $NO_X$ storage reduction catalyst is the lean air-fuel ratio, a $NO_X$ storage amount of the $NO_X$ storage reduction catalyst is equal to or below a specified upper limit, and the temperature of the selective catalytic reduction catalyst is below the first temperature.

7. The exhaust gas control apparatus according to claim 5, wherein
the electronic control unit is configured to control the heater such that the temperature of the selective catalytic reduction catalyst during execution of the recovery processing becomes equal to or above the first temperature and below a third temperature, the third temperature being a temperature that causes exhibition of $NH_3$ desorption.

8. The exhaust gas control apparatus according to claim 6, wherein
the electronic control unit is configured to control the heater such that the temperature of the selective catalytic reduction catalyst during execution of the recovery processing becomes equal to or above the first temperature and below a third temperature, the third temperature being a temperature that causes exhibition of $NH_3$ desorption.

9. The exhaust gas control apparatus according to claim 7, wherein
the electronic control unit is configured to
control the heater such that the temperature of the selective catalytic reduction catalyst during execution of the recovery processing becomes equal to or above the first temperature and below the third temperature, when the temperature of the selective catalytic reduction catalyst upon start of the recovery processing is below the third temperature, and
control the heater such that the temperature of the selective catalytic reduction catalyst during execution of the recovery processing becomes equal to or above a second temperature that is above the third temperature, when the temperature of the selective catalytic reduction catalyst upon start of the recovery processing is equal to or above the third temperature, and
the second temperature is a temperature that causes exhibition of $NH_3$ oxidation.

10. The exhaust gas control apparatus according to claim 8, wherein
the electronic control unit is configured to
control the heater such that the temperature of the selective catalytic reduction catalyst during execution of the recovery processing becomes equal to above the first temperature and below the third temperature, when the temperature of the selective catalytic reduction catalyst upon start of the recovery processing is below the third temperature, and
control the heater such that the temperature of the selective catalytic reduction catalyst during execution of the recovery processing becomes equal to above a second temperature that is above the third temperature, when the temperature of the selective catalytic reduction catalyst upon start of the recovery processing is equal to or above the third temperature, and
the second temperature is a temperature that causes exhibition of $NH_3$ oxidation.

11. The exhaust gas control apparatus according to claim 5, wherein
the electronic control unit is configured to control the heater such that in a case where an amount of gas flowing through the selective catalytic reduction catalyst during execution of the recovery processing is small, a heating amount of the selective catalytic reduction catalyst heated by the heater decreases as compared with a case where the amount of gas is large.

12. The exhaust gas control apparatus according to claim 6, wherein
the electronic control unit is configured to control the heater such that in a case where an amount of gas flowing through the selective catalytic reduction catalyst during execution of the recovery processing is small, a heating amount of the selective catalytic reduction catalyst heated by the heater decreases as compared with a case where the amount of gas is large.

13. The exhaust gas control apparatus according to claim 1, wherein
the electronic control unit is configured to
estimate a requested recovery amount that is an amount of the transition metal ions that need valence recovery, among the transition metal ions included in the selective catalytic reduction catalyst, and
execute the recovery processing such that in a case where the requested recovery amount is small, the prescribed period is shortened as compared in a case where the requested recovery amount is large.

14. The exhaust gas control apparatus according to claim 13, wherein
the electronic control unit is configured not to execute the recovery processing when the estimated requested recovery amount is below a specified threshold.

* * * * *

UNITED STATES PATENT AND TRADEMARK OFFICE
CERTIFICATE OF CORRECTION

PATENT NO. : 10,371,029 B2
APPLICATION NO. : 15/827242
DATED : August 6, 2019
INVENTOR(S) : Tetsuya Sakuma et al.

It is certified that error appears in the above-identified patent and that said Letters Patent is hereby corrected as shown below:

On the Title Page

Item (73) "Assignee: "Tyota Jidasha Kabushiki Kaisha" should read --Assignee: Toyota Jidosha Kabushiki Kaisha--.

Signed and Sealed this
Nineteenth Day of November, 2019

Andrei Iancu
*Director of the United States Patent and Trademark Office*